(12) United States Patent
Park et al.

(10) Patent No.: US 10,990,200 B2
(45) Date of Patent: Apr. 27, 2021

(54) ELECTRONIC DEVICE INCLUDING PEN INPUT DEVICE AND METHOD OF OPERATING THE SAME

(71) Applicant: Samsung Electronics Co., Ltd., Gyeonggi-do (KR)

(72) Inventors: Juwan Park, Gyeonggi-do (KR); Changbyung Park, Gyeonggi-do (KR); Joohoon Lee, Gyeonggi-do (KR); Jongwu Baek, Gyeonggi-do (KR); Hyunsuk Choi, Gyeonggi-do (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 16/595,576

(22) Filed: Oct. 8, 2019

(65) Prior Publication Data

US 2020/0110477 A1     Apr. 9, 2020

(30) Foreign Application Priority Data

Oct. 8, 2018   (KR) .......................... 10-2018-0119592

(51) Int. Cl.
*G06F 3/0354*   (2013.01)
*G06F 3/038*    (2013.01)
*G06F 21/35*    (2013.01)
*G06F 1/16*     (2006.01)
*G06F 3/046*    (2006.01)

(52) U.S. Cl.
CPC ........ *G06F 3/03545* (2013.01); *G06F 1/1643* (2013.01); *G06F 3/0383* (2013.01); *G06F 3/046* (2013.01); *G06F 21/35* (2013.01); *G06F 2203/0384* (2013.01)

(58) Field of Classification Search
None
See application file for complete search history.

(56) References Cited

U.S. PATENT DOCUMENTS 5,821,854 A    10/1998   Dorinski et al.
7,257,374 B1    8/2007   Creigh
(Continued)

FOREIGN PATENT DOCUMENTS

JP         2013-246624 A    12/2013
JP         2018-519583 A     7/2018
KR    10-2013-0097569 A     9/2013

OTHER PUBLICATIONS

International Search Report dated Jan. 21, 2020.

*Primary Examiner* — Ifedayo B Iluyomade
(74) *Attorney, Agent, or Firm* — Cha & Reiter, LLC.

(57) ABSTRACT

An electronic device and method are disclosed herein. The electronic device includes a housing, a display exposed through a portion of the housing, a wireless communication circuit disposed in the housing, a processor disposed in the housing and operatively connected with the display and the wireless communication circuit, and a memory. The processor implements the method, including detecting an approach of a stylus pen in a lock state such that the stylus pen is disposed within a predetermined distance from a surface of the display, and changing the electronic device from the lock state to an unlock state based on at least in part on receiving, through the wireless communication circuit, a wireless signal generated by the stylus pen based on the approach of the stylus pen.

18 Claims, 14 Drawing Sheets

(56) References Cited

U.S. PATENT DOCUMENTS

| | | | |
|---|---|---|---|
| 7,825,820 B2 | 11/2010 | Lee | |
| 8,140,012 B1 | 3/2012 | Causey et al. | |
| 8,346,234 B2 | 1/2013 | Banga et al. | |
| 9,304,609 B2 | 4/2016 | Nakao | |
| 2010/0042826 A1 | 2/2010 | Bull et al. | |
| 2011/0162048 A1 | 6/2011 | Bilbrey et al. | |
| 2011/0250875 A1 | 10/2011 | Huang et al. | |
| 2012/0306927 A1* | 12/2012 | Lee | G06F 3/03545 345/660 |
| 2013/0169573 A1* | 7/2013 | Nishio | G06F 3/0488 345/173 |
| 2013/0222294 A1 | 8/2013 | Choi et al. | |
| 2015/0268712 A1 | 9/2015 | Mouler et al. | |
| 2016/0109968 A1* | 4/2016 | Roh | G06F 3/046 345/173 |
| 2016/0364025 A1 | 12/2016 | Bernstein et al. | |

\* cited by examiner

ELECTRONIC DEVICE INCLUDING PEN INPUT DEVICE AND METHOD OF OPERATING THE SAME

CROSS-REFERENCE TO RELATED APPLICATION(S)

This application is based on and claims priority under 35 U.S.C. 119 to Korean Patent Application No. 10-2018-0119592, filed on Oct. 8, 2018, in the Korean Intellectual Property Office, the disclosure of which is herein incorporated by reference in its entirety.

BACKGROUND

Technical Field

Certain embodiments of the disclosure relate to an electronic device including a pen input device and a method of operating the electronic device.

Description of Related Art

Smartphones, tablet PCs, or other portable electronic devices are increasingly in widespread use, and vigorous efforts are underway to advance the sophistication of pen input devices applicable to portable electronic devices. A portable electronic device, e.g., a smartphone, typically comes with a touchscreen, and the user may designate particular coordinates on the touchscreen by his or her finger and/or a pen input device. The portable electronic device may generate a specific signal based on the designated coordinates on the touchscreen, and the generated signal may be used to control components of the smartphone.

The touchscreen may be operated based on an electrical, infrared, or ultrasonic scheme. Touchscreens adopting the electrical scheme include, e.g., resistive touchscreens (also known as R-type touchscreens) or capacitive touchscreens (also known as C-type touchscreens). Among them, C-type touchscreens are capable of detecting a difference in capacitance at the transparent electrode, caused when touched by an object, and may receive input via a pen input device.

The above information is presented as background information only to assist with an understanding of the disclosure. No determination has been made, and no assertion is made, as to whether any of the above might be applicable as prior art with regard to the disclosure.

SUMMARY

According to certain embodiments, an electronic device may perform connection with an external electronic device via a short-range communication scheme (e.g., Bluetooth low energy (BLE)) and, when the connection with the external electronic device is performed, the security mode (e.g., screen lock) of the electronic device may be released automatically. Such configuration may be made under the assumption that the external electronic device connected with the electronic device is in a reliable place or may be attached to the user's body so that it is expected to be carried by the user. Another factor that makes such configuration probable or possible is that the short-range wireless communication used for connection may be established only within a limited range.

For example, the electronic device may include a pen input device with a power source (e.g., a battery) and a communication device (e.g., a BLE) and may perform connection with the pen input device via a short-range wireless communication scheme. The electronic device may release the security mode set on the electronic device based on at least one signal received from the connected pen input device.

If the electronic device with the pen input device is lost, and someone else gets it, a need arises for preventing the security mode of the electronic device from being released by that person. To that end, according to certain embodiments, the electronic device may be configured to release its security mode via the pen input device specifically when a preset condition is met.

In accordance with certain embodiments, an electronic device includes a housing, a display exposed through a portion of the housing, a wireless communication circuit disposed in the housing, a processor disposed in the housing and operatively connected with the display and the wireless communication circuit, and a memory operatively connected with the processor, wherein the memory stores instructions executable by the processor to cause the electronic device to: detect an approach of a stylus pen in a lock state such that the stylus pen is disposed within a predetermined distance from a surface of the display, and change the electronic device from the lock state to an unlock state based at least in part on receiving, through the wireless communication circuit, a wireless signal generated by the stylus pen based on the approach of the stylus pen.

In accordance with certain embodiments, a method for controlling an electronic device includes detecting an approach of a stylus pen, in a lock state, such that the stylus pen is disposed within a predetermined distance from a surface of the display, and changing the electronic device from the lock state to an unlock state based on at least in part on receiving, through the wireless communication circuit, a wireless signal generated by the stylus pen based on the approach of the stylus pen.

Other aspects, advantages, and salient features of the disclosure will become apparent to those skilled in the art from the following detailed description, which, taken in conjunction with the annexed drawings, discloses example embodiments of the disclosure.

BRIEF DESCRIPTION OF THE DRAWINGS

A more complete appreciation of the disclosure and many of the attendant aspects thereof will be readily obtained as the same becomes better understood by reference to the following detailed description when considered in connection with the accompanying drawings, in which.

Throughout the drawings, like reference numerals will be understood to refer to like parts, components, and structures.

DETAILED DESCRIPTION

Hereinafter, embodiments of the disclosure are described with reference to the accompanying drawings.

Figure 1:
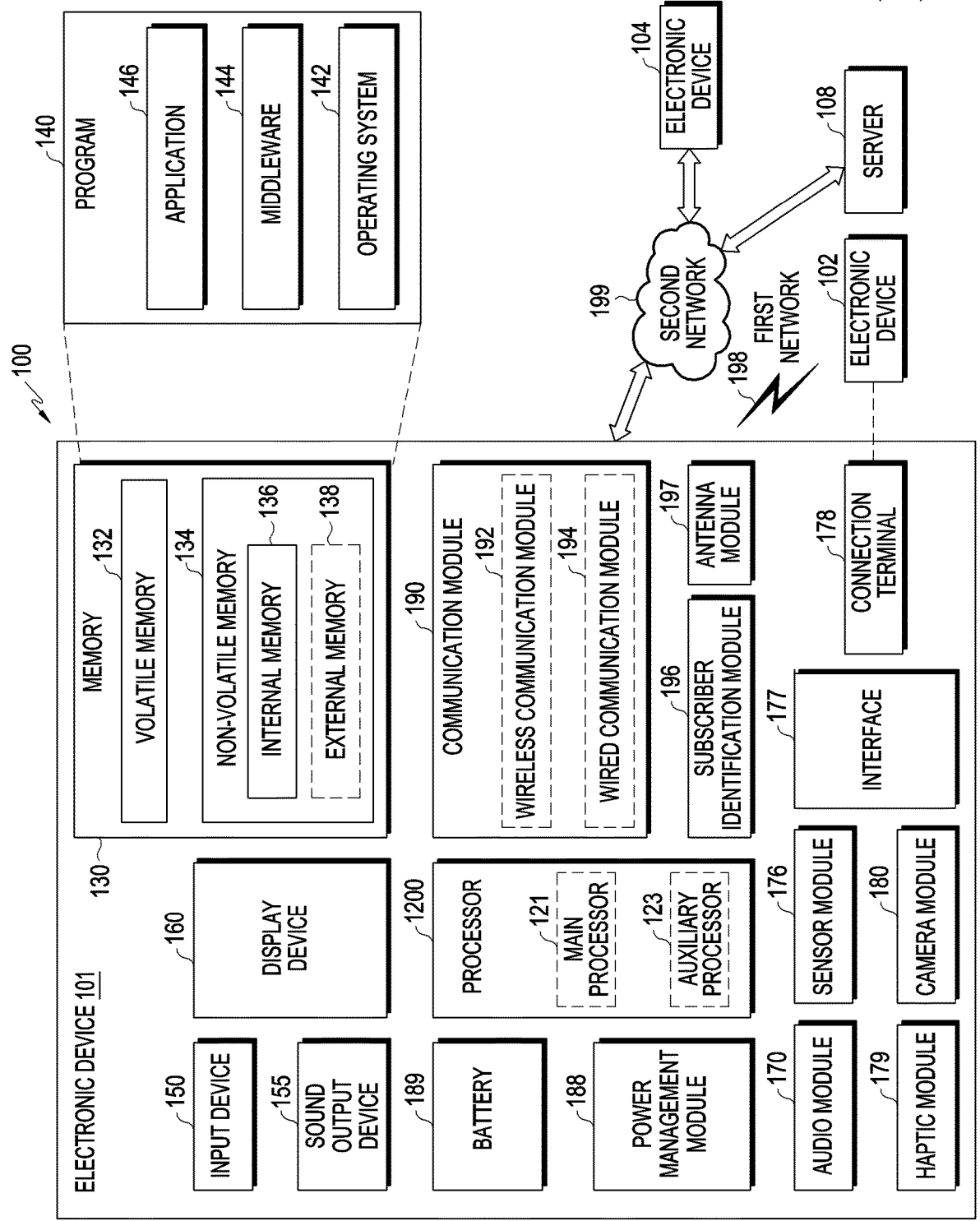
FIG. 1 is a block diagram illustrating an electronic device in a network environment according to an embodiment.

FIG. 1 is a block diagram 1 illustrating an electronic device in a network environment according to an embodiment.

FIG. 1 is a block diagram illustrating an electronic device 101 in a network environment 100 according to certain embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 1200, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 1200 may execute, e.g., software (e.g., a program 140) to control at least one other component (e.g., a hardware or software component) of the electronic device 101 connected with the processor 1200 and may process or compute various data. According to an embodiment, as at least part of the data processing or computation, the processor 1200 may load a command or data received from another component (e.g., the sensor module 176 or the communication module 190) in volatile memory 132, process the command or the data stored in the volatile memory 132, and store resulting data in non-volatile memory 134. According to an embodiment, the processor 1200 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one (e.g., the display device 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 1200 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 1200) of the electronic device 101, from the outside (e.g., a user) of the electronic device 101. The input device 150 may include, for example, a microphone, a mouse, a keyboard, or a digital pen (e.g., a stylus pen). The input device 150 may include a pen input device in which case the pen input device may be attached to or detached from the electronic device 101.

The sound output device 155 may output sound signals to the outside of the electronic device 101. The sound output device 155 may include, for example, a speaker or a receiver. The speaker may be used for general purposes, such as playing multimedia or playing recordings, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain a sound through the input device 150 or output a sound through the sound output device 155 or an external electronic device (e.g., an electronic device 102 (e.g., a speaker or a headphone) directly or wirelessly connected with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his or her tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 388 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or wireless communication channel between the electronic device 101 and an external electronic device (e.g., the electronic device 102, the electronic device 104, or the server 108) and performing communication through the established communication channel. The communication module 190 may include one or more communication processors that are operable independently from the processor 1200 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module may include one antenna including a radiator formed of a conductor or conductive pattern formed on a substrate (e.g., a printed circuit board (PCB)). According to an embodiment, the antenna module 197 may include a plurality of antennas. In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The first and second external electronic devices 102 and 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
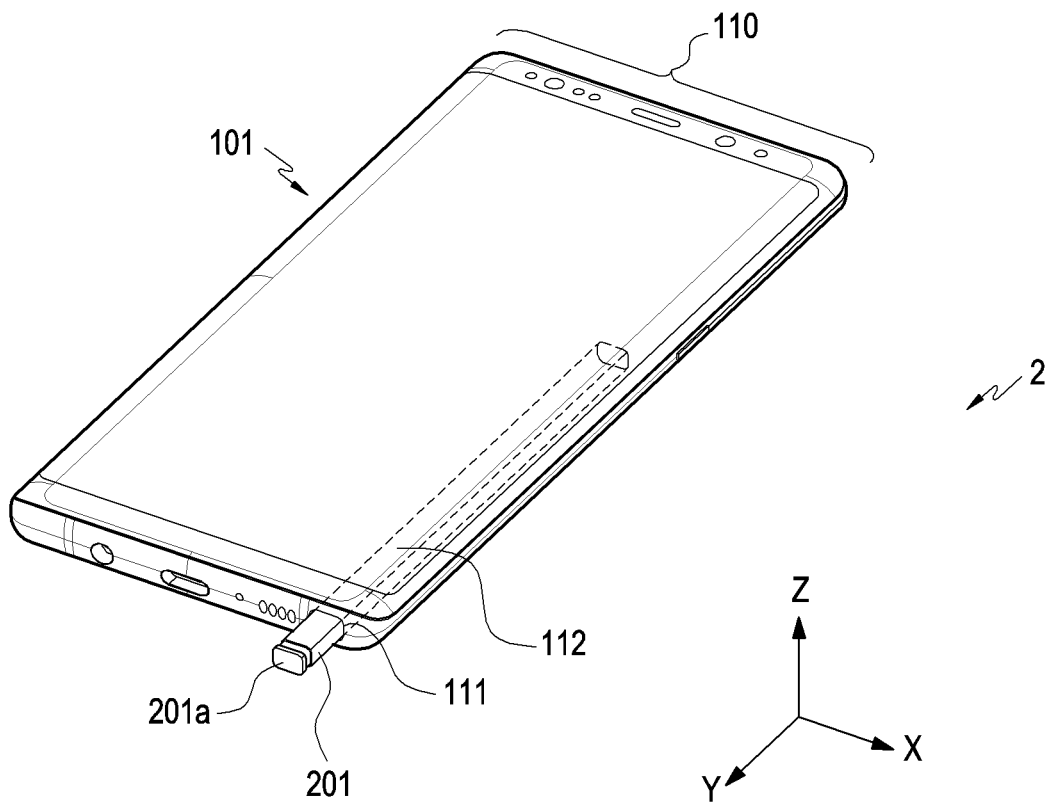
FIG. 2 is a perspective view illustrating an electronic device with a digital pen according to an embodiment.

FIG. 2 is a perspective view 2 illustrating an example electronic device with a digital pen according to an embodiment.

Referring to FIG. 2, according to an embodiment, the electronic device 101 may include the components shown in FIG. 1 and may have a structure for inserting the digital pen 201 (e.g., a stylus pen). The electronic device 101 may include a housing 110 and have a hole 111 in a portion, e.g., a side portion, of the housing. The electronic device 101 may include a receiving space 112 connected with the hole 111, and the digital pen 201 may be inserted into the receiving space 112. In the embodiment shown, the digital pen 201 may have a pressable button 201a at an end to be easily pulled out of the receiving space 112 of the electronic device 101. When the button 201a is pressed, a repulsive mechanism (e.g., at least one spring) configured in association with the button 201a may be operated to allow the digital pen 201 to be removed from the receiving space 112.

Figure 3:
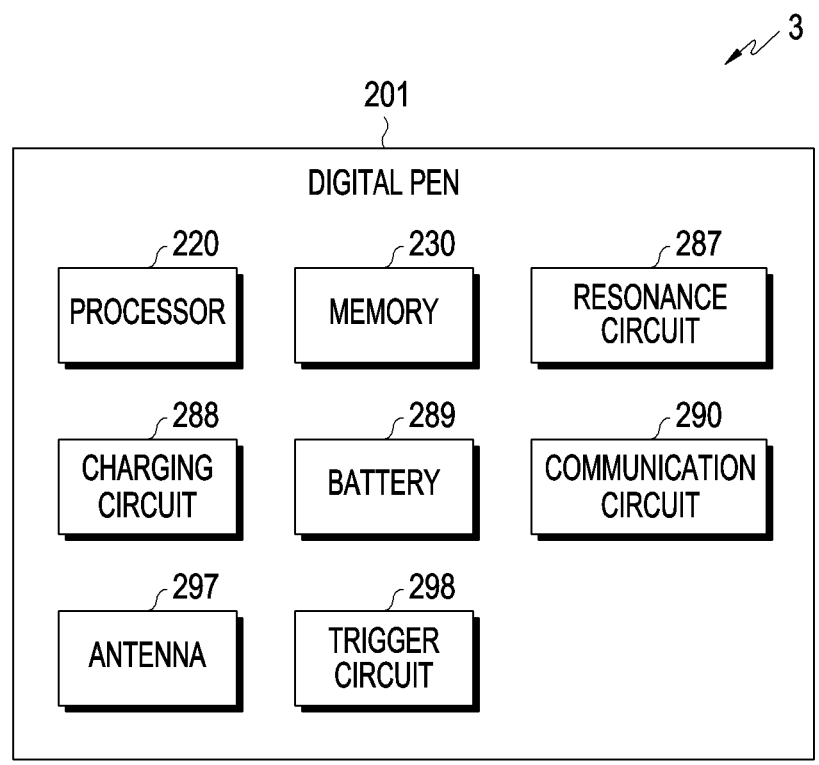
FIG. 3 is a block diagram illustrating a digital pen according to an embodiment.

FIG. 3 is a block diagram 3 illustrating a digital pen according to an embodiment.

Referring to FIG. 3, according to an embodiment, the digital pen 201 may include a processor 220, a memory 230, a resonance circuit 287, a charging circuit 288, a battery 289, a communication circuit 290, an antenna 297, and/or a trigger circuit 298. According to an embodiment, the processor 220, at least part of the resonance circuit 287, and/or at least part of the communication circuit 290 of the digital pen 201 may be configured in the form of a chip or on a printed circuit board. The processor 220, the resonance circuit 287, and/or the communication circuit 290 may be electrically connected with the memory 230, the charging circuit 288, the battery 289, the antenna 297, or the trigger circuit 298. According to an embodiment, the digital pen 201 may be configured only of a resonance circuit and a button.

The processor 220 may include a customized hardware module or a generic processor configured to execute software (e.g., an application program). The processor may include a hardware component (function) or software element (program) including at least one of a communication module or a module to manage the state or environment of the digital pen 201, an input/output interface, a data measuring module, and various sensors provided in the digital pen 201. The processor 220 may include one of, e.g., hardware, software, or firmware, or a combination of two or more thereof. According to an embodiment, the processor 220 may receive a proximate signal corresponding to an electromagnetic signal generated from a digitizer of the electronic device 101 through the resonance circuit 287. When the proximate signal is identified, the processor 220 may control the resonance circuit 287 to transmit an electromagnetic resonance (EMR) input signal to the electronic device 101.

The memory 230 may store information related to the operation of the digital pen 201. For example, the information may include information for communicating with the electronic device 101 and frequency information related to the input operation of the digital pen 201.

The resonance circuit 287 may include at least one of a coil, an inductor, or a capacitor. The resonance circuit 287 may be used for the digital pen 201 to generate a signal having a resonance frequency. For example, to generate the signal, the digital pen 201 may use at least one of an electro-magnetic resonance (EMR) scheme, an active electrostatic (AES) scheme, or an electrically coupled resonance (ECR) scheme. When the digital pen 201 transmits signals via the EMR scheme, the digital pen 201 may generate a signal having a resonance frequency based on an electromagnetic field generated from the inductive panel of the electronic device 101. When the digital pen 201 transmits signals via the AES scheme, the digital pen 201 may generate a signal using a capacitive coupling with the electronic device 101. When the digital pen 201 transmits signals via the ECR scheme, the digital pen 201 may generate a signal having a resonance frequency based on an electric field generated from a capacitive device of the electronic device. According to an embodiment, the resonance circuit 287 may be used to vary the frequency or strength of electromagnetic field according to the user's manipulation state. For example, the resonance circuit 287 may provide a frequency to recognize a hovering input, drawing input, button input, or erasing input.

When connected with the resonance circuit 287 based on a switching circuit, the charging circuit 288 may rectify a resonance signal generated from the resonance circuit 287 into a direct current (DC) signal and provide the DC signal to the battery 289. According to an embodiment, the digital pen 201 may identify whether the digital pen 201 is inserted into the electronic device 101 using a voltage level of a DC signal sensed by the charging circuit 288.

The battery 289 may be configured to store power utilized to operate the digital pen 201. The battery may include, e.g., a lithium-ion battery or a capacitor and may be recharged or replaced. According to an embodiment, the battery 289 may be charged with power (e.g., DC signal (DC power)) received from the charging circuit 288.

The communication circuit 290 may be configured to perform wireless communication between the digital pen 201 and the communication module 190 of the electronic device 101. According to an embodiment, the communication circuit 290 may transmit input information and state information about the digital pen 201 to the electronic device 101 using a short-range communication scheme. For example, the communication circuit 290 may transmit direction information (e.g., motion sensor data) about the digital pen 201 obtained through the trigger circuit 298, voice information entered through the microphone, or remaining power information about the battery 289 to the electronic device 101. As an example, the short-range communication scheme may include at least one of Bluetooth low energy (BLE) or wireless local area network (WLAN).

The antenna 297 may be used to transmit signals or power to the outside (e.g., the electronic device 101) or receive signals or power from the outside. According to an embodiment, the digital pen 201 may include a plurality of antennas 297 and select at least one antenna 297 appropriate for the communication scheme from among the plurality of antennas. The communication circuit 290 may exchange signals or power with an external electronic device through the at least one selected antenna 297.

The trigger circuit 298 may include at least one button or sensor circuit. According to an embodiment, the processor 220 may identify the input scheme (e.g., touch or press) or kind (e.g., EMR button or BLE button) of the button of the digital pen 201. According to an embodiment, the sensor circuit may generate an electrical signal or data value corresponding to an internal operating state or external environmental state of the digital pen 201. For example, the sensor circuit may include at least one of a motion sensor, a remaining battery sensor, a pressure sensor, a light sensor, a temperature sensor, a geomagnetic sensor, or a biometric sensor. According to an embodiment, the trigger circuit 298 may transmit a trigger signal to the electronic device 101 using a signal through a sensor or a button input signal.

Figure 4:
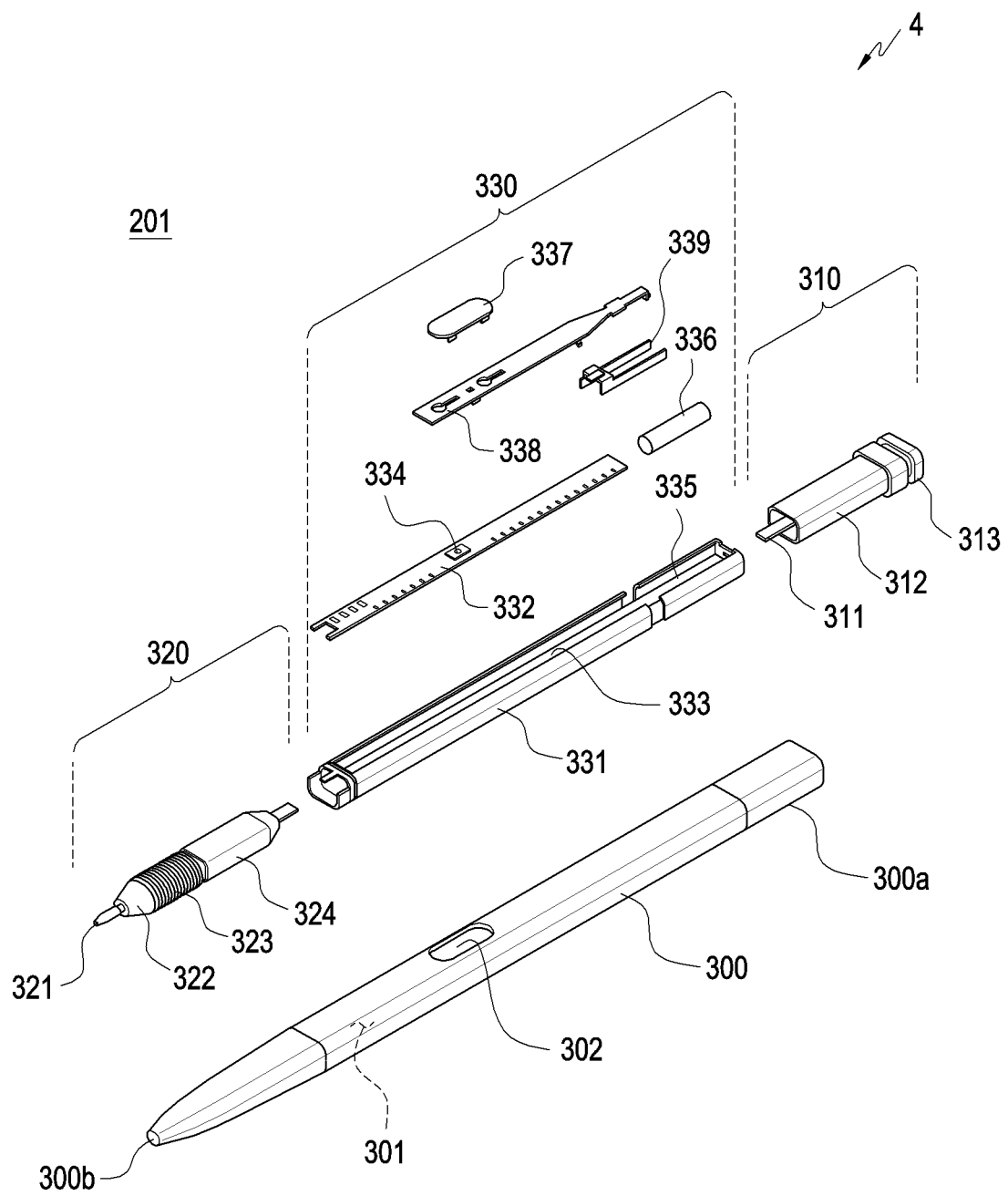
FIG. 4 is an exploded perspective view illustrating a digital pen according to an embodiment.

FIG. 4 is an exploded perspective view 4 illustrating a digital pen 201 according to an embodiment.

Referring to FIG. 4, the digital pen 201 may include a pen housing 300 forming the outer appearance (e.g., casing) of the digital pen 201, and an inner assembly disposed inside the pen housing 300. In the embodiment shown, the inner assembly may include several parts mounted inside the pen and may be inserted into the pen housing 300 by a single assembly operation.

The pen housing 300 may include an elongated receiving space 301 between a first end 300a and a second end 300b. The cross section of the pen housing 300 may be shaped as an ellipse with a longer axis and a shorter axis, and may overall be shaped as an elliptical cylinder. As the interior of the pen corresponds to the shape of the pen housing 300-1, the receiving space 301 of the electronic device 101 may also include an elliptical cross section. The pen housing 300 may be formed using a synthetic resin (e.g., plastic) and/or a metal (e.g., aluminum). According to an embodiment, the second end 300b of the pen housing 300 may be formed of a synthetic resin.

The inner assembly may be elongate, corresponding to the shape of the pen housing 300. The inner assembly may be divided into three main components along the lengthwise direction. For example, the inner assembly may include an ejection member 310 disposed in the position corresponding to the first end 300a of the pen housing 300, a coil part 320 disposed in the position corresponding to the second end 300b of the pen housing 300, and a circuit board part 330 disposed in the position corresponding to the body of the housing.

The ejection member 310 may include a mechanical structure (or configuration) enabling a user to pull the digital pen 201 out of the receiving space 112 of the electronic device 101. According to an embodiment, the ejection member 310 may include a shaft 311, an ejection body 312 disposed around the shaft 311 to form the overall outer appearance of the ejection member 310, and a button part 313. When the inner assembly is fully inserted into the pen housing 300, the portion including the shaft 311 and the ejection body 312 are surrounded by the first end 300a of the pen housing 300, and the button part 313 (e.g., 201a of FIG. 2) may be exposed to an exterior of the first end 300a. A plurality of parts (not shown), including for example cam members and/or elastic members, may be disposed in the ejection body 312 to form a push-pull structure. According to an embodiment, the button part 313 may be substantially coupled with the shaft 311 enabling linear movement forward and back along the ejection body 312. According to an embodiment, the button part 313 may include a button with a jaw (e.g., a lip) which allows the user to pull out the digital pen 201 with his or her fingernail. According to an embodiment, the digital pen 201 may include a sensor capable of detecting the linear motion of the shaft 311 to thereby provide another input scheme.

The coil part 320 may include a pen tip 321, which is exposed to an exterior of the second end 300b when the inner assembly is fully inserted into the pen housing 300, a packing ring 322, a coil 323 wound multiple times, and/or a pen pressure sensor 324 configured to obtain variations in pressure when the pen tip 321 is applied to a surface with force (e.g., pressurized). The packing ring 322 may include epoxy, rubber, urethane, or silicone. The packing ring 322 may be provided for waterproof or dustproof purposes and protect the coil part 320 and the circuit board part 330 from water or dust. According to an embodiment, the coil 323 may form a resonance frequency within a preset frequency band (e.g., 500 kHz) and may be combined with at least one device (e.g., a capacitor) to adjust the resonance frequency produced by the coil 323 within a predetermined range.

The circuit board part 330 may include a printed circuit board 332, a base 331 surrounding at least one surface of the printed circuit board 332 (PCB), and an antenna (either as a separate structure 339, or included in the PCB 332). According to an embodiment, a board seating part 333 may be formed on top of the base 331 to allow the printed circuit board 332 to be disposed thereon, and the printed circuit board 332 may be seated and fastened onto the board seating part 333. According to an embodiment, the printed circuit board 332 may include a top surface and a bottom surface. A variable capacitor or a switch 334 may be disposed on the top surface of the printed circuit board 332, and a charging circuit, a battery, or a communication circuit may be disposed on the bottom surface of the printed circuit board 332. The battery may include an electric double layered capacitor (EDLC). The charging circuit may be positioned between the coil 323 and the battery and may include a voltage detector circuit and a rectifier.

The antenna may include an antenna structure 339 as shown in FIG. 4 and/or an antenna embedded in the printed circuit board 332. According to an embodiment, a switch 334 may be provided on the printed circuit board 332. A side button 337 provided to the digital pen 201 may be used to press the switch 334 and may be exposed to the outside through a side opening 302 of the pen housing 300. The side button 337 may be supported by the supporting member 338 and, if no external force is applied to the side button 337, the supporting member 338 may provide an elastic restoration force to allow the side button 337 to remain or go back to a predetermined position.

The circuit board part 330 may include another packing ring such as an O-ring. For example, O-rings may be disposed at both ends of the base 331, thereby forming a sealing structure between the base 331 and the pen housing 300. According to an embodiment, the supporting member 338 may at least partially come in tight contact with the inner wall of the pen housing 300 around the side opening 302, thereby forming a sealing structure. For example, the circuit board part 330 may also form a waterproof and/or dustproof seals and structures similar to the packing ring 322 of the coil part 320.

The digital pen 201 may include a battery seating part 335 formed on the top surface of the base 331 to allow the battery 336 to sit thereon. The battery 336 mountable on the battery seating part 335 may include, e.g., a cylinder-type battery.

The digital pen 201 may include a microphone (not shown). The microphone may be connected directly to the printed circuit board 332 or to a separate flexible printed circuit board (FPCB) (not shown) connected with the printed circuit board 332. According to an embodiment, the microphone may be disposed in a position parallel with the side button 337 along the longer direction of the digital pen.

According to an embodiment, an electronic device includes a housing, a display exposed through a portion of the housing, a wireless communication circuit disposed in the housing, a processor disposed in the housing and operatively connected with the display and the wireless communication circuit, and a memory operatively connected with the processor, in which the memory stores instructions executed to enable the processor to detect an approach of a stylus pen within a predetermined distance from a surface of the display in a lock state and change the electronic device from the lock state to an unlock state based on at least part of receiving a wireless signal generated from the stylus pen by the approach of the stylus pen from the stylus pen through the wireless communication circuit.

According to an embodiment, the display may be configured to detect the stylus pen by generating an electromagnetic signal.

According to an embodiment, the housing may further include a recess extending long and the stylus pen removably inserted into the recess.

According to an embodiment, the wireless communication circuit may be configured to support a Bluetooth standard.

According to an embodiment, the instructions may be configured to enable the processor to change the electronic device from the lock state to the unlock state at a first time in response to a user's input, change the electronic device from the unlock state to the lock state at a second time after changing to the unlock state, detect the approach of the stylus pen within the predetermined distance from the surface of the display in the lock state after the second time, receive the wireless signal generated from the stylus pen by the approach of the stylus pen from the stylus pen through the wireless communication circuit at a third time, and change the electronic device from the lock state to the unlock state if the third time is within a predetermined time of the first time.

According to an embodiment, the instructions may be configured to enable the processor to, in a first operation, change the electronic device from the unlock state to the lock state at the second time while using a first application program relevant to use of the stylus pen before the second time and change the electronic device from the lock state to the unlock state at the third time based on the approach of the stylus pen at the third time and, in a second operation, change the electronic device from the unlock state to the lock state at the second time while using a second application program irrelevant to use of the stylus pen before the second time and stop changing the electronic device from the lock state to the unlock state at the third time despite the approach of the stylus pen at the third time.

According to an embodiment, the instructions may be configured to enable the processor to, in a first operation, when an input finally identified before changing the electronic device from the unlock state to the lock state at the second time is relevant to the stylus pen, change the electronic device from the lock state to the unlock state at the third time based on the approach of the stylus pen at the third time and, in a second operation, when the input finally identified before changing the electronic device from the unlock state to the lock state at the second time is irrelevant to the stylus pen, stop changing the electronic device from the lock state to the unlock state at the third time despite the approach of the stylus pen at the third time.

According to an embodiment, the instructions may be configured to enable the processor to detect the approach of the stylus pen within the predetermined distance from the surface of the display in the lock state at a first time, receive a wireless signal generated from the stylus pen by the approach of the stylus pen from the stylus pen through the wireless communication circuit at a second time, and change the electronic device from the lock state to the unlock state if the second time is within a predetermined time of the first time.

According to an embodiment, the instructions may be configured to enable the processor to, when at least one predetermined operation is identified at a first time, stop changing the electronic device from the lock state to the unlock state during a predetermined time after the first time despite reception of a wireless signal generated from the stylus pen through the wireless communication circuit. The at least one predetermined operation may include a first operation of detecting a movement of the electronic device, a second operation of detecting the stylus pen inserted in a recess formed in the housing, a third operation of determining that a distance between the stylus pen and the electronic device is a threshold or more based on the wireless signal generated from the stylus pen, and a fourth operation of detecting a touch input by an object other than the stylus pen.

According to an embodiment, the wireless signal generated from the stylus pen may include at least one of information for a location of the stylus pen with respect to the electronic device, information for a time when at least one signal generated from the stylus pen is transmitted to the electronic device, information for a battery of the stylus pen, and on/off information for at least one switch included in the stylus pen.

Figure 5:
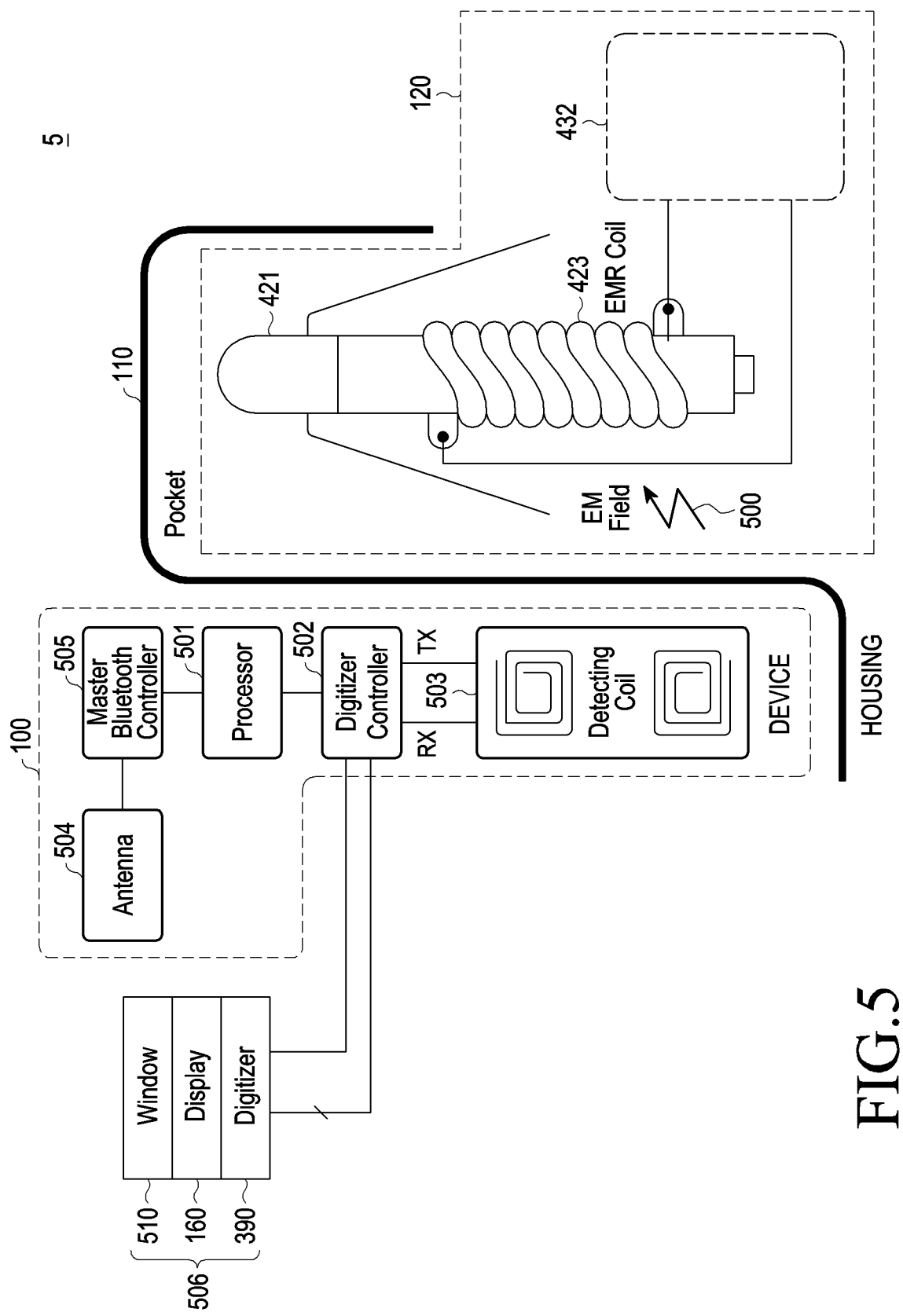
FIG. 5 is a view illustrating the relationship between an electronic device and a pen input device according to an embodiment.

FIG. 5 is a view 5 illustrating the relationship between an electronic device and a pen input device according to an embodiment.

According to an embodiment, a housing 110 of an electronic device 101 may include at least one opening (e.g., the hole 111 of FIG. 2), and a pen input device 120 may be inserted into an internal space connected with the hole or opening 111. The electronic device 101 may include a processor 501 (e.g., the processor 1200 of FIG. 1), a digitizer controller 502, a detection coil 503, an antenna 504, and a master Bluetooth controller 505. The pen input device 120 may include a pen tip 421, a coil 423, and a circuit board 432. The display device 506 may include a window 510, a display 160, and an electromagnetic induction panel 390 (e.g., a digitizer). According to an embodiment, the display device 506 may be included in the electronic device 101 and may be exposed through at least a portion of the housing 110 to the outside. According to an embodiment, the display device 506 may be a stand-alone device provided separately from the electronic device 101.

The processor 501 may control the components included in the electronic device 101 or monitor the state of the components. For example, the processor 501 may control the electromagnetic induction panel 390 (e.g., a digitizer) via the digitizer controller 502 or may obtain signals received from the electromagnetic induction panel 390 (e.g., a digitizer). The processor 501 may transmit electric or magnetic signals (e.g., the electromagnetic signal 500) to an external electronic device (e.g., the pen input device 120) via the detection coil 503 or receive electric or magnetic signals from the external electronic device (e.g., the pen input device 120) via the detection coil 503. The processor 501 may determine the location information or state information for the pen input device 120 based on the signal received from the pen input device 120 via the electromagnetic induction panel 390 (e.g., a digitizer) or the detection coil 503. One or more detection coils 503 may be disposed in at least a portion of the internal space of the electronic device 101 provided to allow the pen input device 120 to be inserted.

According to an embodiment, the processor 501 may determine whether the pen input device 120 has been fully inserted in the internal space provided in the electronic device 101 based on data communicated between the detection coil 503 and the coil 423 or may identify the state of the battery (not shown) provided in the pen input device 120 and then control at least one component so that the battery may be recharged. For example, the processor 501 may determine the location of the pen input device 120 based on data communicated between the detection coil 503 of the electronic device 101 and the coil 423 of the pen input device 120 and, upon determining that the determined location of the pen input device 120 is within a range in which charging is possible, transfer power signals (e.g., the electromagnetic signal 500) to the pen input device 120 via the detection coil 503.

According to an embodiment, the display device 506 may be replaced with a touchscreen panel which lacks the electromagnetic induction panel 390 (e.g., a digitizer). In this case, the processor 501 may identify the location and input of the pen input device 120 using a sensor included in the touchscreen panel.

Figure 6:
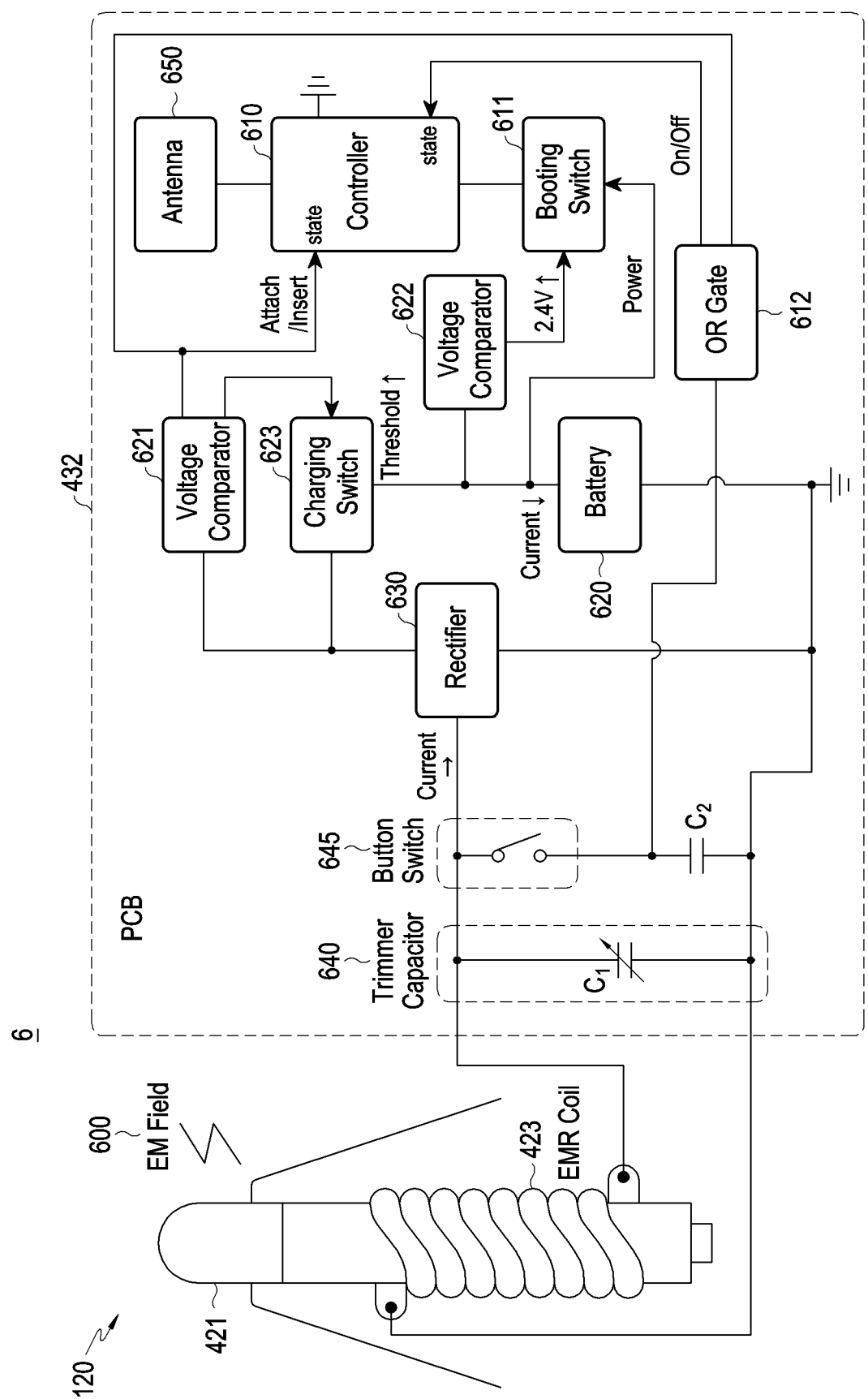
FIG. 6 is a view illustrating a structure of a pen input device according to an embodiment.

FIG. 6 is a view 6 illustrating a structure of a pen input device 120 according to an embodiment, providing a more detailed view of the circuit board 432.

According to an embodiment, the pen input device 120 may include a pen tip 421, a coil 423, and a circuit board 432. At least one of a controller 610 (e.g., the processor 1200 of FIG. 1), a booting switch 611, an OR gate 612, a battery 620 (e.g., the battery 189 of FIG. 1), voltage comparators 621 and 622, a charging switch 623, a rectifier 630, a trimmer capacitor 640, an antenna 650, and a button switch 645 may be disposed on the circuit board 432.

The coil 423 may detect an electromagnetic signal 600 applied from the outside or may radiate a particular frequency of signal. The coil 423, along with the capacitor and inductor included in the pen input device 120, may implement a resonance circuit.

The controller 610 may control the components included in the pen input device 120 and/or monitor the state of the components. For example, the controller 610 may change the state of at least one of the switches 611 and 623 included in the pen input device 120 based on the electromagnetic signal 600 received via the coil 423 or the wireless signal received via the antenna 650. The controller 610 may include a communication module (e.g., BLE circuitry) capable of performing wireless communication. According to an embodiment, the communication module may be provided in the controller 610 or provided independently from the controller 610.

The battery 620 may supply power for actively operating one or more components in the pen input device 120.

The first voltage comparator 621 may measure the voltage of direct current (DC) power output from the rectifier 630 and transfer the result of measurement to the controller 610. According to an embodiment, when a first voltage (e.g., 1 volt) is measured as a result of comparison by the first voltage comparator 621, the controller 610 may determine that the electromagnetic signal 600 received via the coil 423 is the signal for detection applied from the electromagnetic induction panel 390 (e.g., a digitizer) of the electronic device 101. In this case, the controller 610 may determine whether the electromagnetic induction panel 390 (e.g., a digitizer) and the pen tip 421 approach each other based on the properties (e.g., magnitude or frequency) of the electromagnetic signal 600. When a second voltage (e.g., 2 volts) is measured as a result of comparison by the first voltage comparator 621, the controller 610 may determine that the electromagnetic signal 600 received via the coil 423 is a signal for charging received for charging the battery 620 of the pen input device 120. In this case, the controller 610 may control the state of the charging switch 623 so that DC power output from the rectifier 630 may be transferred to the battery 620.

The OR gate 612 may be used to control the function according to an input of the button switch 645 based on the voltage measured by the first voltage comparator 621. For example, when the first voltage (e.g., 1 volt) is measured as a result of comparison by the first voltage comparator 621, and an input for the button switch 645 is received, the controller 610 may control the OR gate 612 to execute a first function (e.g., output an EMR signal via the coil 423). When a third voltage (e.g., 0 volts) is measured as a result of comparison by the first voltage comparator 621, and an input for the button switch 645 is received, the controller 610 may control the OR gate 612 to execute a second function (e.g., output a wireless signal via the antenna 650).

The second voltage comparator 622 may measure the voltage output from the battery 620 and transfer the result of measurement to the controller 610. According to an embodiment, when the voltage measured by the second voltage comparator 622 is a threshold (e.g., 2.4 volts) or more, the controller 610 may control the booting switch 611 to activate the communication module.

The rectifier 630 may rectify alternating current (AC) power received from the outside through the coil 423 into DC power. The DC power rectified into by the rectifier 630 may be transferred to the first voltage comparator 621 and the charging switch 623. According to an embodiment, the rectifier 630 may include at least one diode.

The trimmer capacitor 640 may be a circuit whose capacitance may be varied under the control of the controller 610, and the trimmer capacitor 640 may include one or more capacitors, one or more transistors, one or more input/output ports, and a logic gate. According to an embodiment, the logic gate may change the state of one or more transistors under the control of the controller 610 and may thus adjust the capacitance of the trimmer capacitor 640.

The button switch 645 may be used to vary the capacitance or inductance of the LC circuit based on an input for at least one switch (e.g., the switch 435) provided in the pen input device 120. As capacitance or inductance is varied, the resonance frequency of the signal generated by the resonance circuit may be varied, and the varied resonance frequency may be used as a signal corresponding to the input of the button 434.

The antenna 650 may transmit a wireless signal generated by the communication module to an external electronic device (e.g., the electronic device 101) or receive a wireless signal generated by the external electronic device. For example, the controller 610 may generate a wireless signal containing command information according to the input of the button 434 provided in the pen input device 120 or state information about the pen input device 120 via the communication module and may transmit the generated wireless signal to the external electronic device via the antenna 650.

According to an embodiment, the controller 610 may determine whether the pen input device 120 is fully inserted in the internal space provided in the electronic device 101 based on the electromagnetic signal 600 received via the coil 423. Subsequently, the controller 610 may identify the state of the battery 620 of the pen input device 120 and then control the components to charge the battery 620. For example, the controller 610 may receive power received from the outside via the coil 423 and control the components to allow the received power to be transferred through the rectifier 630, the first voltage comparator 621, and the charging switch 623 to the battery 620.

Figure 7:
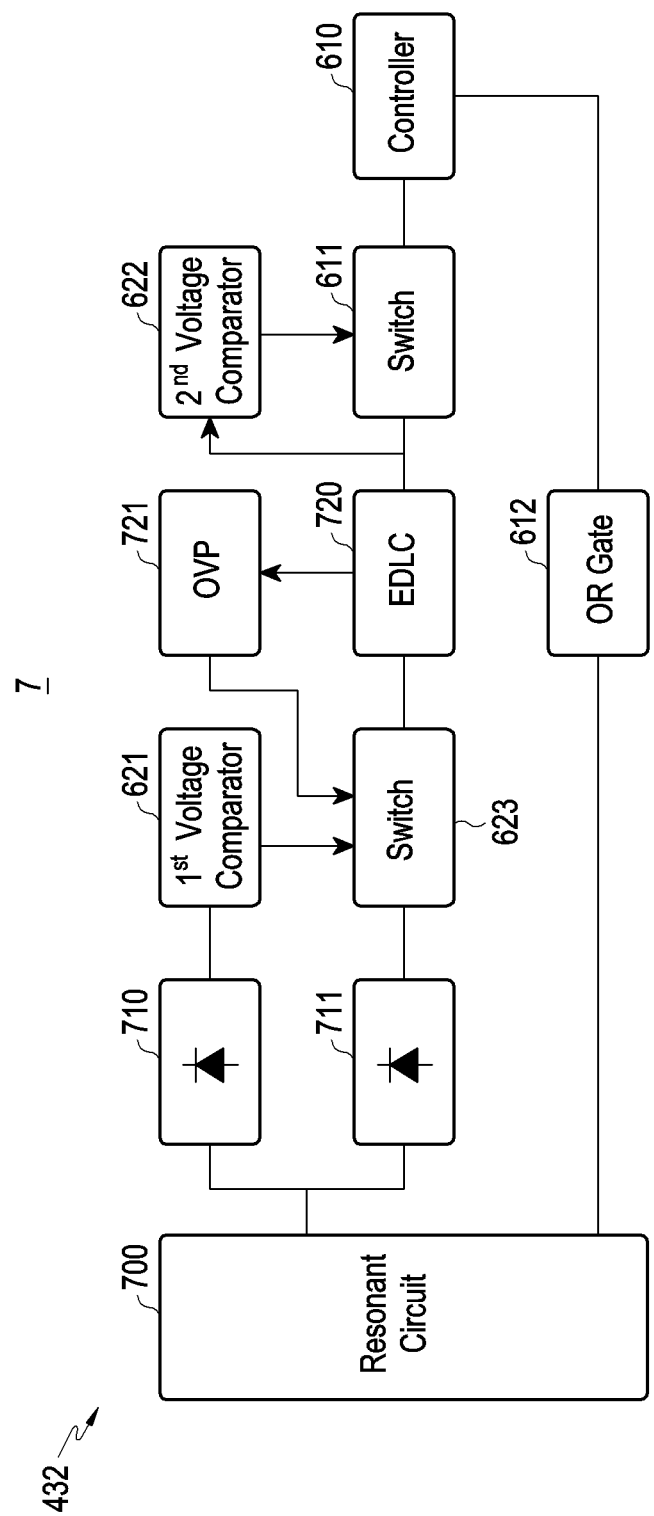
FIG. 7 is a block diagram illustrating a structure of a pen input device according to an embodiment.

FIG. 7 is a block diagram 7 illustrating a structure of a pen input device according to an embodiment.

According to an embodiment, at least one of a controller 610, one or more switches 611 and 623, an OR gate 612, an electric double-layer capacitor (EDLC) 720, a first voltage comparator 621, a second voltage comparator 622, a resonance circuit 700, one or more diodes 710 and 711, and an overvoltage protector (OVP) 721 may be disposed on the circuit board 432 of the pen input device 120.

The resonance circuit 700 may include the coil 423, one or more capacitors, and one or more inductors and may generate a predetermined resonance frequency of signal.

The first diode 710 may rectify AC power transferred from the resonance circuit 700 into DC power and transfer the DC power to the first voltage comparator 621. The second diode 711 may rectify AC power transferred from the resonance circuit 700 into DC power and transfer the DC power to the charging switch 623.

According to an embodiment, the controller 610 may measure the voltage of the DC power output from the first diode 710 via the first voltage comparator 621. Upon determining that the measured voltage corresponds to a preset first voltage, the controller 610 may control the OR gate 612 to output the EMR signal via the coil 423. Upon determining that the measured voltage corresponds to a preset second voltage, the controller 610 may control the OR gate 612 to output the wireless signal via the antenna 650.

The EDLC 720 may correspond to the battery 620 of FIG. 6. The EDLC 720 may supply power to at least one of the components of the pen input device 120.

The OVP 721 may be used to control the charging switch 623 based on the charging state of the EDLC 720. According to an embodiment, the controller 610 may monitor the voltage of the EDLC 720 via the OVP 721 while charging the EDLC 720. When the voltage of the EDLC 720 as measured is determined to be a preset value or more, the controller 610 may determine that charging is complete. The controller 610 may prevent the power received from an external power supply from being excessively transferred to the EDLC 720, by changing the state of the charging switch 623 via the OVP 721.

Figure 8:
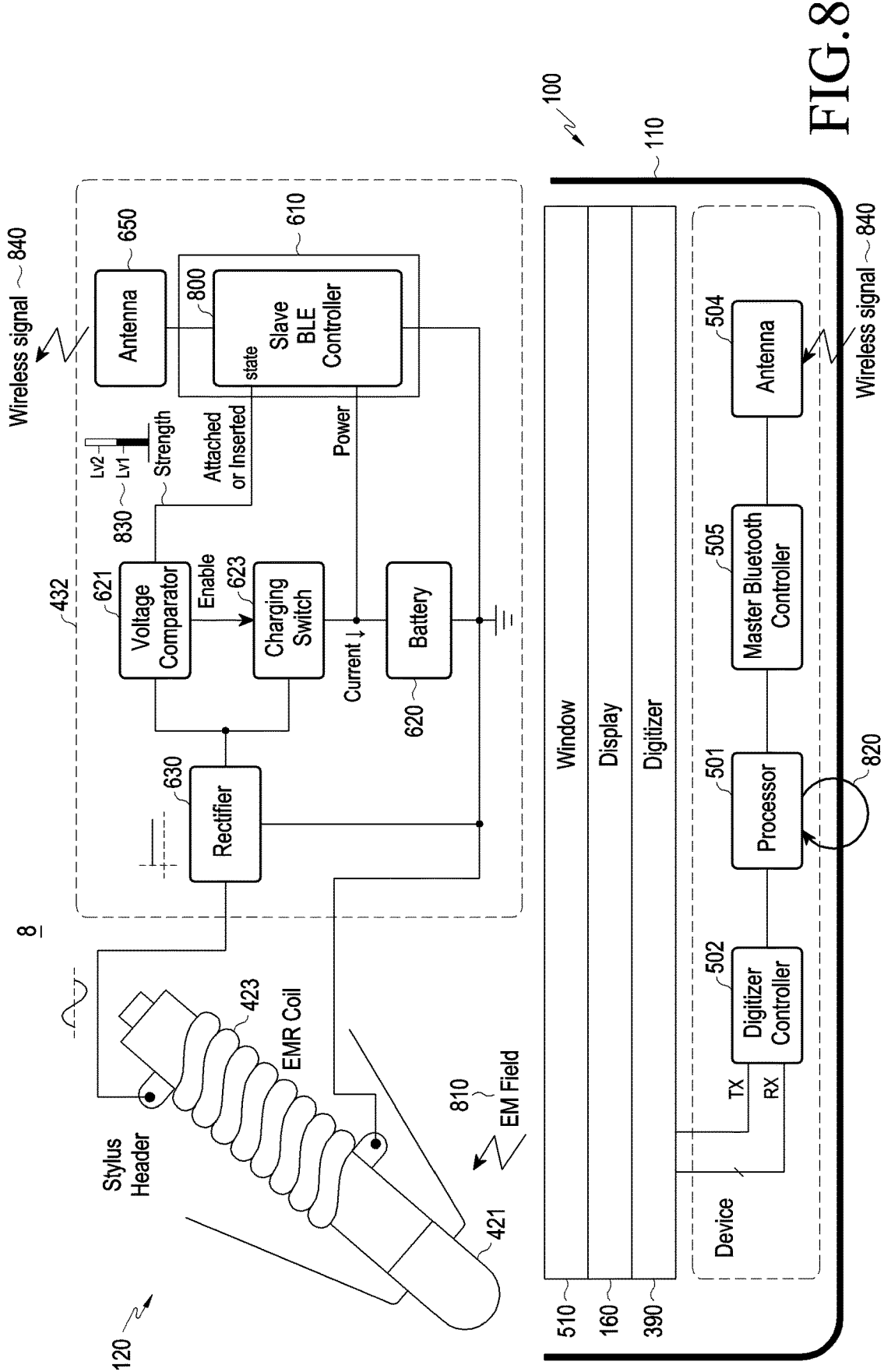
FIG. 8 is a view illustrating data transmitted or received between an electronic device and a pen input device according to an embodiment.

FIG. 8 is a view 8 illustrating data transmitted or received between an electronic device and a pen input device according to an example embodiment.

According to an embodiment, an electronic device 101 may include a housing 110, a window 510, a display 160, an electromagnetic induction panel 390 (e.g., a digitizer), a processor 501, a digitizer controller 502, an antenna 504, and a master Bluetooth controller 505. A pen input device 120 may include a pen tip 421, a coil 423, and a circuit board 432. A controller 610, a slave BLE controller 800, a battery 620, a voltage comparator 621, a charging switch 623, a rectifier 630, and an antenna 650 may be disposed on the circuit board 432. It will be apparent to one of ordinary skill in the art that the electronic device 101 may include all or less than all of the listed components of the electronic device 101 of FIG. 1, and the pen input device 120 may include all or less than all of the listed components of the pen input device 120 of FIGS. 4 to 6.

According to an embodiment, the processor 501 of the electronic device 101 may control the electromagnetic induction panel 390 (e.g., a digitizer) via the digitizer controller 502, thereby periodically outputting electromagnetic signals 810. The electromagnetic signal 810 output from the electromagnetic induction panel 390 (e.g., a digitizer) may be applied to the coil 423 of the pen input device 120. In response to application of the electromagnetic signal 810 to the coil 423, the pen input device 120 may output an EMR signal corresponding to the electromagnetic signal 810. The electromagnetic induction panel 390 (e.g., a digitizer) of the electronic device 101 may receive the EMR signal output from the pen input device 120. The digitizer controller 502 of the electronic device 101 may identify the location and degree of approach of the pen input device 120 to the display 160 based on, e.g., the input position and strength of the EMR signal received via the electromagnetic induction panel 390 (e.g., a digitizer). According to an embodiment, the degree of approach of the pen input device 120 to the display 160 may also be identified by various sensors (not shown) (e.g., a hovering sensor, a touch sensor, or an illuminance sensor) provided in the electronic device 101.

According to an embodiment, when the strength of the EMR signal is a threshold or more, and the frequency of the EMR signal is a designated resonance frequency, the processor 501 of the electronic device 101 may determine that input generated by the pen tip 421 of the pen input device 120 has been initiated. The processor 501 of the electronic device 101 may store information 820 related to the input generated by the pen tip 421 of the pen input device 120, such as a first time in which the input generated by the pen tip 421 of the pen input device 120 is determined to have been initiated. The information 820 may be stored in a memory (e.g., the memory 130 of FIG. 1) of the electronic device 101.

According to an embodiment, the controller 610 of the pen input device 120 may rectify the electromagnetic signal 810 received from the outside into DC power by the rectifier 630. The controller 610 may measure the voltage of the DC power via the voltage comparator 621. When the measured voltage is a preset first voltage 830, the controller 610 may generate an EMR signal corresponding to the electromagnetic signal 810 via a resonance circuit (e.g., the resonance circuit 700 of FIG. 7) and output the generated EMR signal through the coil 423. When the measured voltage is the preset first voltage 830, the controller 610 may connect the slave BLE controller 800 with the battery 620 and supply power to the slave BLE controller 800, thereby activating the slave BLE controller 800. The activated slave BLE controller 800 may perform connection with the master Bluetooth controller 505 of the electronic device 101 and generate a wireless signal 840 to be transferred to the master Bluetooth controller 505. The wireless signal 840 generated by the slave BLE controller 800 may be output through the antenna 650 of the pen input device 120. Although the slave BLE controller 800 may be operated based on the BLE communication standards, the communication scheme used herein is merely an example. According to an embodiment, the pen input device 120 may perform communication in communication schemes following various Bluetooth standards, as well as BLE communication. According to an embodiment, the pen input device 120 may perform communication based on other short-range communication schemes than the Bluetooth standards, such as NFC communication, Zigbee communication, visible light communication, or infrared communication schemes, and it will readily be appreciated by one of ordinary skill in the art that the disclosure is not limited to a particular communication scheme.

According to an embodiment, the slave BLE controller 800 of the pen input device 120 may include various pieces of information related to the pen input device 120 in the wireless signal 840. For example, the wireless signal 840 may include, e.g., state information for the battery 620, such as the remaining power and time of the battery 620, information for the time when the electromagnetic signal 810 is applied to the pen input device 120, slave latency information for the slave BLE controller 800, information for a delay caused by slave latency, and information for a pressing of at least one button 434 provided in the pen input device 120.

According to an embodiment, the antenna 504 of the electronic device 101 may receive the wireless signal 840 output from the antenna 650 of the pen input device 120. The processor 501 of the electronic device 101 may store information related to the input by the slave BLE controller 800 of the pen input device 120, such as a second time when the wireless signal 840 is received, in the memory (e.g., the memory 130 of FIG. 1) of the electronic device 101.

According to an embodiment, the electronic device 101 may change the electronic device 101 from the lock state to the unlock state at a first time in response to a user input. Thereafter, the electronic device 101 may change the electronic device 101 from the unlock state to the lock state at a second time. At a third time, the electronic device 101 may receive a wireless signal generated from the pen input device 120 as the pen input device 120 approaches. When the difference between the third time when the wireless signal generated from the pen input device 120 is received and the first time when the electronic device 101 changes from the lock state to the unlock state is within a predetermined time, the electronic device 101 may change its state from the lock state to the unlock state.

According to an embodiment, the electronic device 101 may determine whether the time interval between the time when the EMR signal by the pen tip 421 of the pen input device 120 is received and the time when the wireless signal 840 is received is a threshold or less. When the time interval is the threshold or less, the processor 501 of the electronic device 101 may determine that the pen input device 120 is a reliable device.

The processor 501 of the electronic device 101 may obtain information about the pen input device 120 including the slave BLE controller 800 from the slave BLE controller 800 connected with the master Bluetooth controller 505. The processor 501 may identify that the EMR signal received through the electromagnetic induction panel 390 (e.g., a digitizer) is one received from the pen input device 120 based on the obtained information. The processor 501 may identify that the EMR signal is one received from the reliable pen input device 120 through the wireless signal 840.

If at least one signal is received from the reliable pen input device 120, the processor 501 of the electronic device 101 may release the security mode set on the electronic device 101 even without separate password entry. For example, if the time interval between signal receptions is the threshold or less while the security mode of the electronic device 101 is active (e.g., the electronic device 101 is in the lock state), the processor 501 may determine that there is input by a reliable device. In this case, the processor 501 may change the electronic device 101 from the lock state to the unlock state even with no separate password entry for releasing the security mode set on the electronic device 101.

According to an embodiment, if the state in which no additional input is received lasts a preset time, the processor 501 of the electronic device 101 may power off the display 160 and activate the security mode of the electronic device 101. For example, in a case where no more EMR signal is received after the last one has been received at a particular time, if a preset time elapses after the particular time, the processor 501 may power off the display 160 and activate the security mode of the electronic device 101. In this case, the processor 501 may store, in the memory of the electronic device 101, information about the particular time, which is the time when the last EMR signal was received before the security mode of the electronic device 101 is activated. Powering off the display 160 may include maintaining the always-on-display (AOD) function active.

At a time after the security mode of the electronic device 101 has been activated, an EMR signal generated by the coil 423 of the pen input device 120 may be received via the electromagnetic induction panel 390 (e.g., a digitizer) of the electronic device 101. Subsequently, the wireless signal 840 generated by the slave BLE controller 800 of the pen input device 120 may be received through the master Bluetooth controller 505 of the electronic device 101. In this case, the processor 501 may determine whether the time interval between the time when the EMR signal is received and the time when the wireless signal 840 is received is a threshold or less. If the time interval between the time of reception of the EMR signal and the time of reception of the wireless signal 840 is the threshold or less, the processor 501 may additionally determine whether the time interval between the particular time and the time when the EMR signal is received is a threshold or less. Upon determining that the time interval between the particular time and the time of reception of the EMR signal is the threshold or less, subsequent to the time interval between the time of reception of the EMR signal and the time of reception of the wireless signal 840, the processor 501 may automatically release the security mode for processing the received EMR signal.

If the time interval between the particular time and the time of reception of the EMR signal is the threshold or less, the processor 501 may determine that there is continuity between the EMR signal received before the particular time and the EMR signal received after the particular time. Upon determining that there is continuity between the EMR signals received at and after the particular time, the processor 501 may automatically release the security mode set on the electronic device 101 based on, at least, the EMR signal received after the particular time even with no separate release operation (e.g., password entry or biometric information entry). The security mode of the electronic device 101 may be set when the user of the electronic device 101 pauses handwriting with the pen input device 120. As in such a case, if a separate release operation (e.g., password input or biometric input) is utilized to release the security mode with the pen input device 120 in the user's hand, the user may feel uncomfortable. Thus, when the time interval between the particular time and the time of reception of the EMR signal is the threshold or less, the processor 501 may determine that there is continuity between the EMR signals received at and after the particular time and, even with no release operation according to a predetermined procedure, the processor 501 may release the security mode set on the electronic device 101.

According to an embodiment, the processor 501 of the electronic device 101 may store, in the memory, information for the application which used to be in execution before the security mode of the electronic device 101 is activated or stored, in the memory, information for the application which has processed the last input received before the security mode is activated. After the security mode of the electronic device 101 has been activated, an EMR signal generated by the coil 423 of the pen input device 120 may be received via the electromagnetic induction panel 390 (e.g., a digitizer) of the electronic device 101. Subsequently, the wireless signal 840 generated by the slave BLE controller 800 of the pen input device 120 may be received through the master Bluetooth controller 505 of the electronic device 101. In this case, the processor 501 may determine whether the time interval between the time when the EMR signal is received and the time when the wireless signal 840 is received is a threshold or less. If the time interval between the time of reception of the EMR signal and the time of reception of the wireless signal 840 is the threshold or less, the processor 501 may identify the information for the application stored in the memory before the security mode is activated. Upon identifying that the application used to be in execution immediately before the security mode is activated is relevant to the pen input device 120, the processor 501 may determine that there is continuity between the state of the electronic device 101 before the security mode is activated and the state of the electronic device 101 at the time of reception of the EMR signal. If the last input received before the security mode is activated is the EMR signal or wireless signal by the pen input device 120, and information for the application which has processed the EMR signal or wireless signal is identified from the memory, the processor 501 may determine that there is continuity between the state of the electronic device 101 before the security mode is activated and the state of the electronic device 101 at the time of reception of the EMR signal.

For example, when the time interval between the time of reception of the EMR signal and the time of reception of the wireless signal 840 is a threshold or less, the processor 501 may identify whether the application with the highest Z-order except for the instruction utilized for releasing the security mode is associated with the pen input device 120. If the identified application is associated with the pen input device 120, the processor 501 may release the security mode set on the electronic device 101 based on at least one of the received EMR signal and the received wireless signal.

According to an embodiment, the processor 501 of the electronic device 101 may determine whether the last input received before the security mode of the electronic device 101 is activated is one received from the pen input device 120. Upon determining that the last input received before the security mode is activated is one received from the pen input device 120, the processor 501 may release the security mode set on the electronic device 101 based on at least one of the wireless signal and EMR signal received from the pen input device 120 at any time after the security mode is activated.

According to an embodiment, although the EMR signal or wireless signal is received from the pen input device 120 which is reliable, if a relocating or movement of the electronic device 101 is detected by a sensor (e.g., a gyro sensor, acceleration sensor, or motion sensor) of the electronic device 101, the processor 501 of the electronic device 101 may refrain from automatically releasing the security mode set on the electronic device 101. Although the EMR signal or wireless signal is received from the reliable pen input device 120, if the pen input device 120 is determined to be inserted into the housing 110 of the electronic device 101, the processor 501 of the electronic device 101 may refrain from automatically releasing the security mode set on the electronic device 101. Although the EMR signal or wireless signal is received from the reliable pen input device 120, if the distance between the pen input device 120 and the electronic device 101 is determined to exceed a threshold, the processor 501 of the electronic device 101 may refrain from automatically releasing the security mode set on the electronic device 101. If an input is received from other input means than the reliable pen input device 120, the processor 501 of the electronic device 101 may refrain from automatically releasing the security mode set on the electronic device 101.

Figure 9:
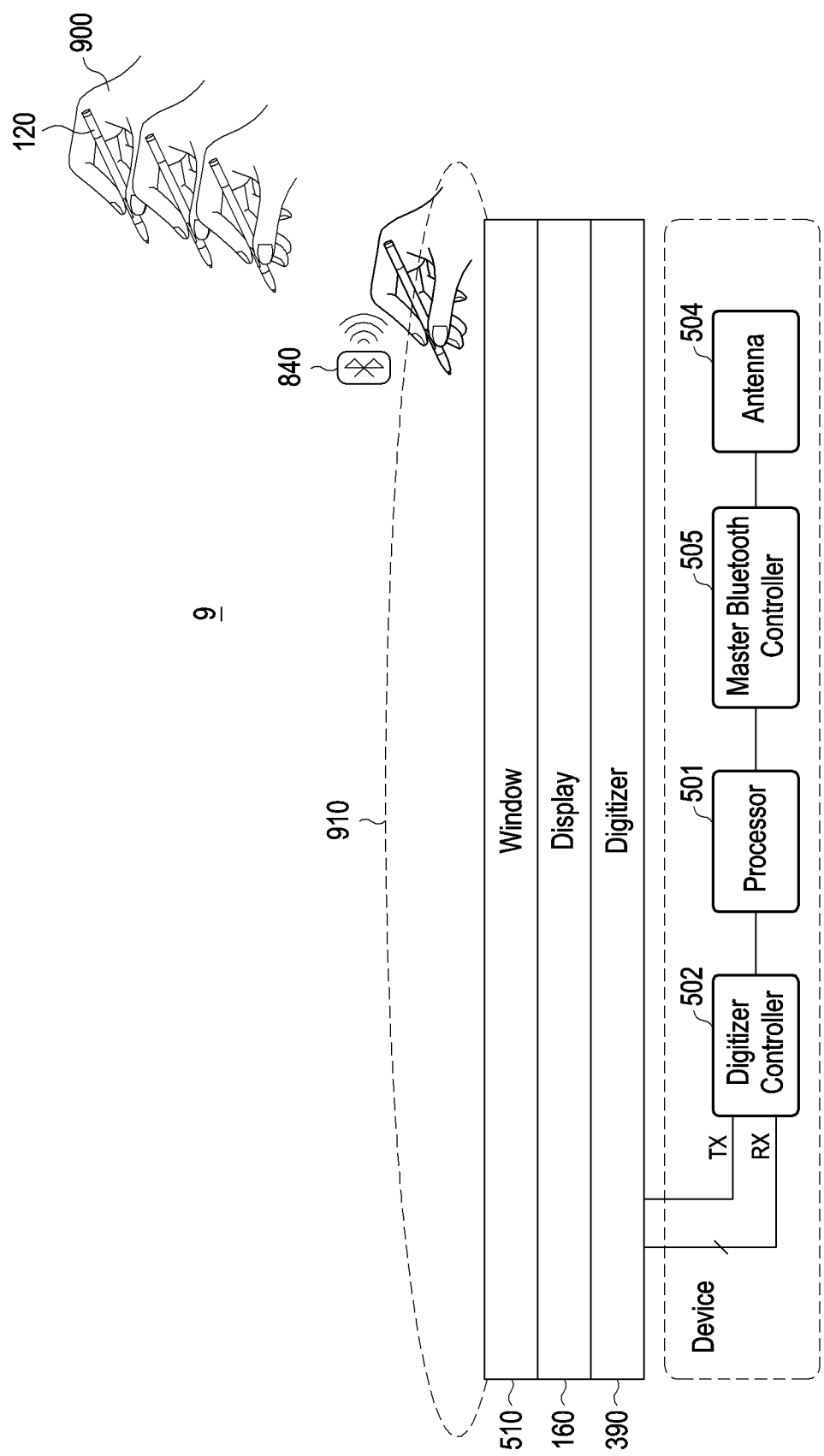
FIG. 9 is a view illustrating a method of releasing a security mode of an electronic device via a pen input device according to an embodiment.

FIG. 9 is a view 9 illustrating a method of releasing a security mode of an electronic device via a pen input device according to an embodiment.

According to an embodiment, an electronic device may include a window 510, a display 160, an electromagnetic induction panel 390 (e.g., a digitizer), a processor 501, a digitizer controller 502, an antenna 504, and a master Bluetooth controller 505. The processor 501 of the electronic device may detect an object entering a first area 910 using the electromagnetic induction panel 390 (e.g., a digitizer) or various sensors (e.g., a hovering sensor, illuminance sensor, or touch sensor) provided in the electronic device. For example, when the pen input device 120 in the user's hand 900 enters the first area 910, the processor 501 may identify the approach of the pen input device 120 and the degree (e.g., angle) of approach using the electromagnetic induction panel 390 (e.g., a digitizer).

According to an embodiment, the processor 501 may control the electromagnetic induction panel 390 (e.g., a digitizer) via the digitizer controller 502, thereby periodically outputting signals of a preset resonance frequency. The signals output periodically may be set to have a detection range according to the first area 910. When the pen input device 120 enters the first area 910, the processor 501 may perform connection with the pen input device 120 via the master Bluetooth controller 505. The processor 501 may receive the EMR signal output from the pen input device 120 through the electromagnetic induction panel 390 (e.g., a digitizer) and the wireless signal output from the pen input device 120 through the antenna 504.

According to an embodiment, the pen input device 120 may receive an electromagnetic signal transferred from the electromagnetic induction panel 390 (e.g., a digitizer) after entering the first area 910 and, accordingly, generate and output the EMR signal. The pen input device 120 may activate the slave BLE controller (e.g., the slave BLE controller 800 of FIG. 8) included in the pen input device 120 based on the received electromagnetic signal and perform connection with the master Bluetooth controller 505. The pen input device 120 may generate the wireless signal 840 via the slave BLE controller 800 based on the received electromagnetic signal, and output the generated wireless signal 840 through the antenna (e.g., the antenna 650 of FIG. 8) included in the pen input device 120.

As set forth above, the electronic device 101 may detect an approach of the pen input device 120 within a predetermined distance, i.e., within the first area 910, in the lock state. Specifically, the electronic device 101 may detect the EMR signal generated by the pen input device 120, thereby detecting the approach of the pen input device 120. The electronic device 101 may receive the EMR signal generated from the pen input device 120 as the pen input device 120 approaches. The electronic device 101 may change the electronic device 101 from the lock state to the unlock state based on at least part of reception of the EMR signal.

According to an embodiment, the electronic device 101 may change its state from the lock state to the unlock state at a first time and change its state from the unlock state to the lock state at a second time. Thereafter, the electronic device 101 may detect the EMR signal in the lock state, thereby detecting approach of the pen input device 120 within the first area 910. The electronic device 101 may receive the wireless signal 840 through, e.g., the antenna 504, at a third time as the pen input device 120 approaches.

If the third time is within a predetermined time of the first time, the electronic device 101 may change its state from the lock state to the unlock state.

Figure 10:
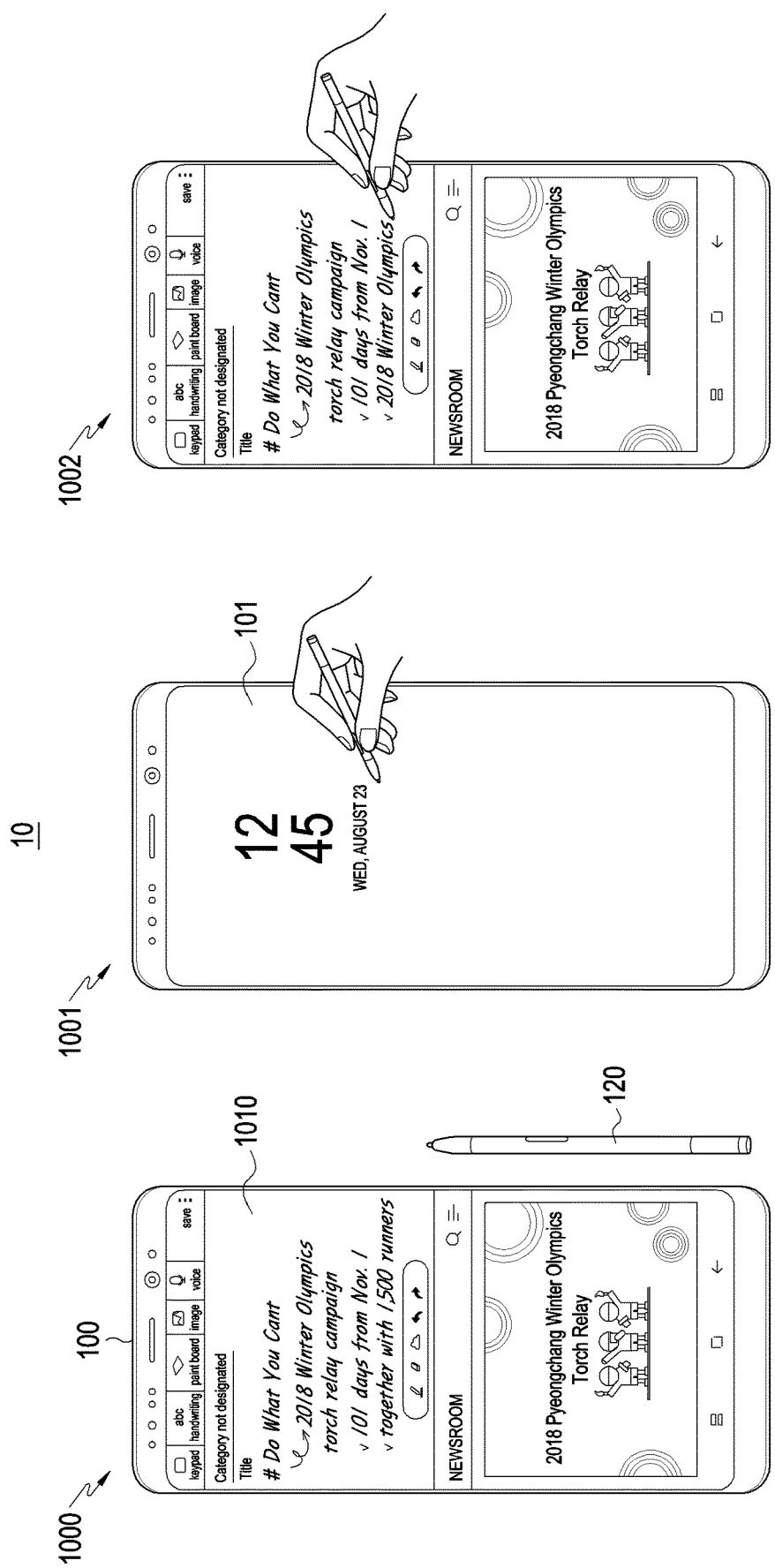
FIG. 10 is a view illustrating a method of releasing a security mode of an electronic device via a pen input device and performing continuous handwriting input according to an embodiment.

FIG. 10 is a view 10 illustrating a method of releasing a security mode of an electronic device via a pen input device and performing continuous handwriting input according to an embodiment.

A first portion 1000 of the view of FIG. 10 illustrates an electronic device 101 running a memo application 1010. The electronic device 101 may receive a handwriting input generated via the pen input device 120, and display, in real-time, the received handwriting input on the memo application 1010.

According to an embodiment, if no handwriting input by the pen input device 120 is received during a preset time, the electronic device 101 may activate a security mode. If the security mode is activated, the electronic device 101 may power off the display 160 or run the always-on-display (AOD) function as seen in element 1001.

A second example view 1001 of FIG. 10 illustrates the electronic device 101 performing the always-on-display (AOD) function as the security mode is activated. Upon receiving an input by the pen input device 120 while the security mode is active, the electronic device 101 may identify the application which was being executed before the security mode was activated. If the application is relevant to the pen input device 120, the electronic device 101 may release the security mode without an additional or separate security process (e.g., without requiring password entry or biometric information entry).

A third example view 1002 of FIG. 10 illustrates the electronic device 101 in which the security mode has been released with no separate process for releasing the security mode. The electronic device 101 may release the security mode without any separate process for releasing the security mode based on the input by the pen input device 120. According to an embodiment, the electronic device 101 may execute the application which was in execution before the security mode is activated while releasing the security mode. Thus, continuity may remain between the inputs before and after the security mode is activated.

Figure 11:
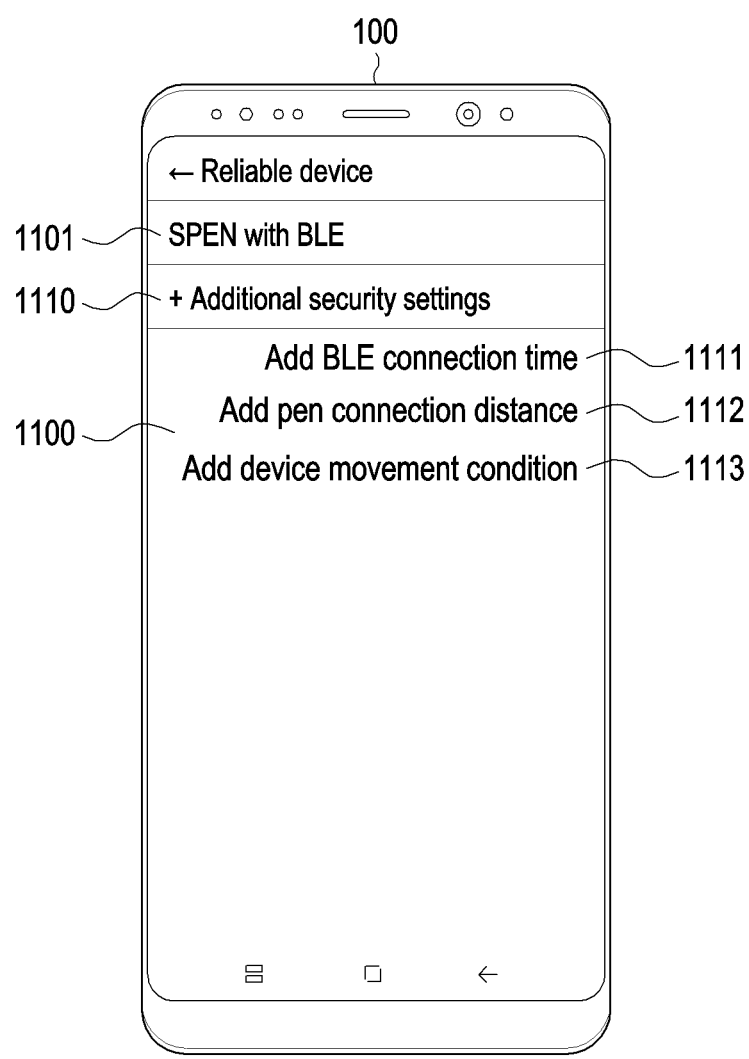
FIG. 11 is a view illustrating a method of setting a condition for releasing a security mode of an electronic device via a pen input device according to an embodiment.

FIG. 11 is a view 11 illustrating an example method of setting a condition for releasing a security mode of an electronic device via a pen input device according to an embodiment.

According to an embodiment, the electronic device 101 may provide various settings for a method of releasing the security mode set on the electronic device 101 without any separate release process based on detection of a reliable device.

Referring to FIG. 11, the electronic device 101 may provide a user interface 1100 for establishing a short-range wireless communication (e.g., BLE) connection between the electronic device 101 and the pen input device 120 (e.g., Samsung S-PEN). According to an embodiment, the user interface 1100 may display information 1101 for an external electronic device communicatively connected with the electronic device 101 via short-range wireless communication. For example, the external electronic device currently in communicative connection with the electronic device 101 via short-range wireless communication may be an "S-PEN" Samsung™ Stylus.

The user interface 1100 may provide an additional security setting tab 1110 used to set the security mode of the electronic device 101. When an input is received on the additional security setting tab 1110, the electronic device 101 may provide a menu for changing the settings for the security mode. For example, the electronic device 101 may provide a menu including at least one of an "add BLE connection time" tab 1111, an "add pen connection distance" tab 1112, and an "add device movement condition" tab 1113.

According to an embodiment, in a case where the "add BLE connection time" tab 1111 is selected, the electronic device 101 may automatically release the security mode set on the electronic device 101 if the time interval between the time when the EMR signal output through the coil 423 of the pen input device 120 is received by the digitizer 390 of the electronic device 101 and the time when the wireless signal output through the slave BLE controller 800 of the pen input device 120 is received by the master Bluetooth controller 505 of the electronic device 101 is a threshold or less. When the "add pen connection" distance tab 1112 is selected, the electronic device 101 may use a threshold distance between the electronic device 101 and the pen input device 120 as a determination condition for releasing the security mode set on the electronic device 101.

When the "add device movement" condition tab 1113 is selected, the electronic device 101 may be configured to refrain from automatically releasing the security mode of the electronic device 101 upon detecting a relocation or movement of the electronic device 101.

Figure 12:
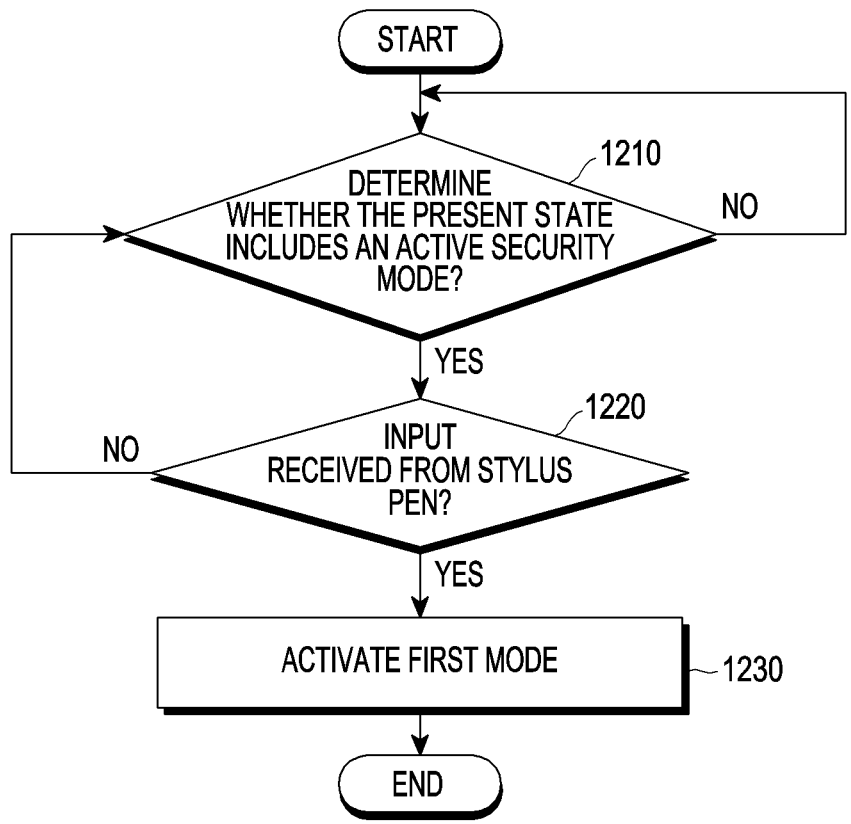
FIG. 12 is a flowchart illustrating a method of changing settings of an electronic device to allow a security mode of the electronic device to be released via a pen input device according to an embodiment.

FIG. 12 is a flowchart 12 illustrating an example method of changing settings of an electronic device to allow a security mode of the electronic device to be released via a pen input device according to an embodiment. According to an embodiment, an entity of performing the method may be a processor (e.g., the processor 501 of FIG. 5) of an electronic device (e.g., the electronic device 101 of FIG. 1).

In operation 1210, the processor may determine the state of the electronic device. According to an embodiment, the processor may identify whether the security mode of the electronic device is active. If the security mode of the electronic device 101 is in the inactive state, i.e., the unlock state, the processor may perform operation 1220.

In operation 1220, the processor may determine whether an input of a stylus pen (e.g., the pen input device 120 of FIG. 2) is received. The input of the stylus pen may include an EMR signal by the coil included in the stylus pen or a wireless signal by the slave BLE controller of the stylus pen or, according to an embodiment, the input may also include a signal by the detection coil of the electronic device. The processor may receive at least one input of the stylus pen via the digitizer controller or master Bluetooth controller of the electronic device and, thus, identify the location of the stylus pen.

In operation 1230, upon determining that the input of the stylus pen is received, the processor may activate a first mode. Here, the first mode may indicate a mode in which the security mode of the electronic device may be automatically released with no separate release process (e.g., a security authentication challenge) based on the input of the stylus pen. When the first mode is activated as the input of the stylus pen is received, the electronic device may register the stylus pen as a "reliable" device. If no input is received by the electronic device 101 within a preset time after the first mode is activated, the processor may activate the security mode of the electronic device.

It is understood that in the disclosed method, some or all of the operations disclosed in FIG. 12 may be omitted or repeated multiple times. Each operation of FIG. 12 should be interpreted as an embodiment, and any single operation should not be interpreted as dependent upon another operation.

Figure 13:
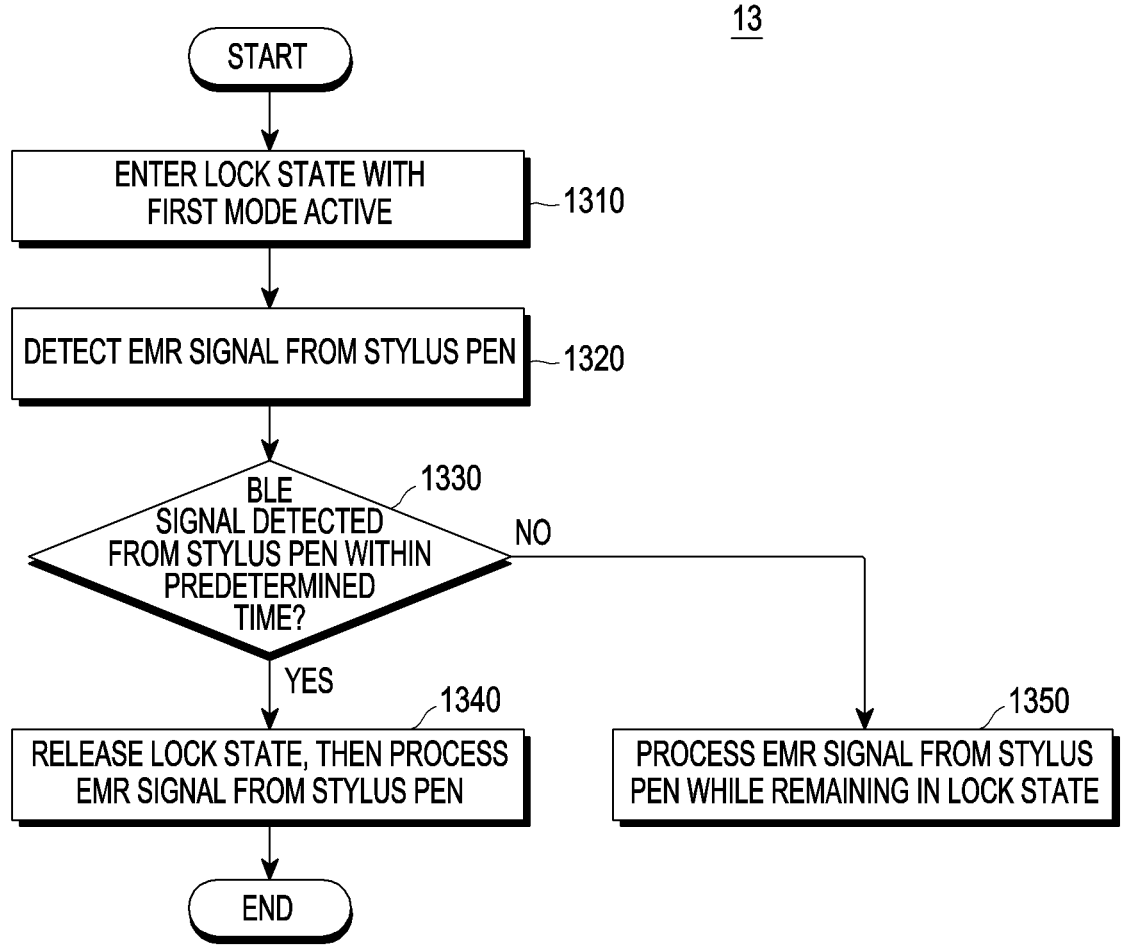
FIG. 13 is a flowchart illustrating a method of releasing a security mode of an electronic device based on at least one signal received from a pen input device according to an embodiment.

FIG. 13 is a flowchart 13 illustrating a method of releasing a security mode of an electronic device based on at least one signal received from a pen input device according to an embodiment. According to an embodiment an entity of performing the method may be a processor (e.g., the processor 501 of FIG. 5) of an electronic device (e.g., the electronic device 101 of FIG. 1).

In operation 1310, when no input is received by the electronic device within a preset time, the processor may activate the security mode of the electronic device, while the first mode remains active. For example, the electronic device may enter the lock state. When the electronic device enters the lock state, the processor may power off the display of the electronic device.

In operation 1320, the processor may detect the EMR signal of the stylus pen (e.g., the pen input device 120 of FIG. 2). According to an embodiment, the processor may detect the EMR signal of the pen input device 120 received through the digitizer (e.g., the digitizer 390 of FIG. 3) of the electronic device while the security mode of the electronic device is in the active state.

In operation 1330, the processor may determine whether the BLE signal of the stylus pen 120 is detected within a threshold time after the EMR signal is detected. Here, the BLE signal may indicate a wireless signal (e.g., the wireless signal 840) which is generated by the slave BLE controller (e.g., the slave BLE controller 800 of FIG. 8) provided in the stylus pen and transferred to the master Bluetooth controller (e.g., the master Bluetooth controller 505 of FIG. 5) of the electronic device.

When the BLE signal of the stylus pen 120 is detected within the threshold time, the processor may release the lock state of the electronic device and process the EMR signal received from the stylus pen 120 in operation 1340.

When no BLE signal of the stylus pen 120 is detected within the threshold time, the processor may process the EMR signal received from the stylus pen 120 with the electronic device staying in the lock state in operation 1350.

It is understood that in the disclosed method, some or all of the operations disclosed in FIG. 13 may be omitted or repeated multiple times. Each operation of FIG. 13 should be interpreted as an embodiment, and any single operation should not be interpreted as dependent upon another operation.

Figure 14:
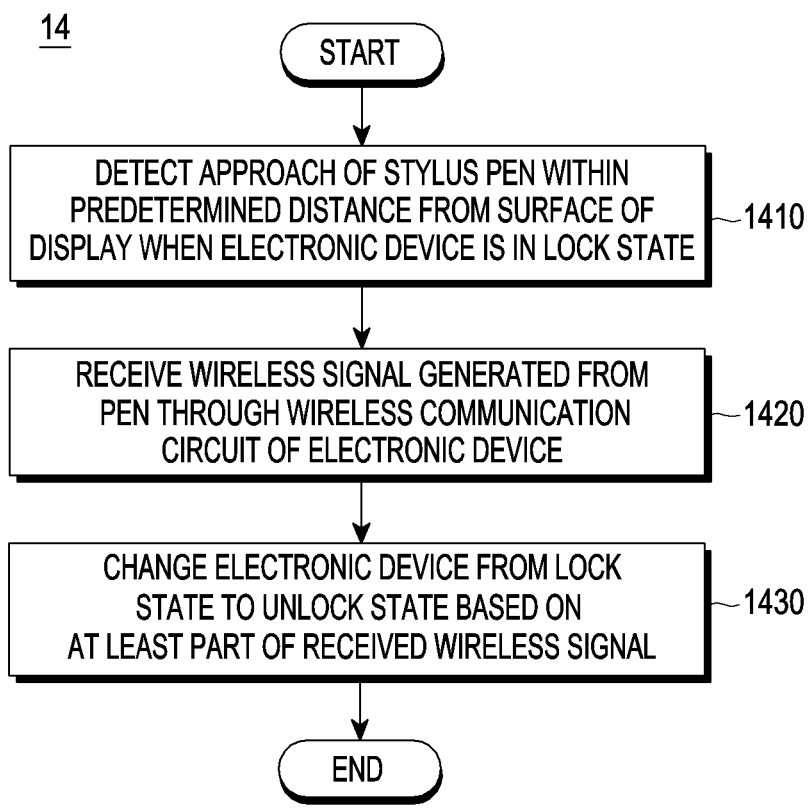
FIG. 14 is a flowchart illustrating a method of controlling at least one of an electronic device and a pen input device according to an embodiment, in which the same or similar reference denotations may be used to refer to the same or similar elements throughout the specification and the drawings.

FIG. 14 is a flowchart 14 illustrating an example method of controlling at least one of an electronic device and a pen input device according to an embodiment. According to an embodiment an entity of performing the method may be a processor (e.g., the processor 501 of FIG. 5) of an electronic device (e.g., the electronic device 101 of FIG. 1).

In operation 1410, when the electronic device is in the lock state, the processor may detect an approach of the stylus pen (e.g., the pen input device 120 of FIG. 2) within a predetermined distance from the surface of the display (e.g., the display 160 of FIG. 1). For example, the processor may periodically output a signal for detecting the stylus pen 120 via the digitizer (e.g., the electromagnetic induction panel 390 of FIG. 3) of the electronic device when the electronic device is in the lock state. According to an embodiment, the processor may determine the location and degree of approach of the stylus pen 120 based on the EMR signal output from the stylus pen 120.

In operation 1420, the processor may receive the wireless signal generated from the stylus pen 120 through the wireless communication circuit of the electronic device. According to an embodiment, upon determining that the stylus pen 120 is disposed within a preset distance from the surface of the display 160, the processor may activate the wireless communication circuit (e.g., BLE circuitry), and thereby establish a connection with the wireless communication circuit of the stylus pen 120. For example, the electronic device may perform connection with the stylus pen 120 via Bluetooth communication. The processor may receive the wireless signal generated from the stylus pen 120 via the established wireless communication connection.

In operation 1430, the processor may change the electronic device from the lock state to an unlock state based on at least part of the received wireless signal. For example, when the wireless signal is received from the stylus pen 120 within a threshold time after the EMR signal is received from the stylus pen 120, the processor may identify the stylus pen 120 as a "reliable" electronic device and release the security mode set on the electronic device.

It is understood that in the disclosed method, some or all of the operations disclosed in FIG. 14 may be omitted or repeated multiple times. Each operation of FIG. 14 should be interpreted as an embodiment, and any single operation should not be interpreted as dependent upon another operation.

According to an embodiment, a method for controlling an electronic device, which includes a housing, a display exposed through a portion of the housing, a wireless communication circuit disposed in the housing, a processor disposed in the housing and operatively connected with the display and the wireless communication circuit, and a memory operatively connected with the processor, includes detecting an approach of a stylus pen within a predetermined distance from a surface of the display when the electronic device is in a lock state and changing the electronic device from the lock state to an unlock state based on at least part of receiving a wireless signal generated from the stylus pen by the approach of the stylus pen from the stylus pen through the wireless communication circuit.

According to an embodiment, the display may be configured to detect the stylus pen by generating an electromagnetic signal.

According to an embodiment, the housing may further include a recess extending long and the stylus pen removably inserted into the recess.

According to an embodiment, the wireless communication circuit may be configured to support a Bluetooth standard.

According to an embodiment, the method may further include changing the electronic device from the lock state to the unlock state at a first time in response to a user's input, changing the electronic device from the unlock state to the lock state at a second time after changing to the unlock state, detecting the approach of the stylus pen within the predetermined distance from the surface of the display in the lock state after the second time, receiving the wireless signal generated from the stylus pen by the approach of the stylus pen from the stylus pen through the wireless communication circuit at a third time, and changing the electronic device from the lock state to the unlock state if the third time is within a predetermined time of the first time.

According to an embodiment, the method may further include a first operation, the first operating including: changing the electronic device from the unlock state to the lock state at the second time while using a first application program relevant to use of the stylus pen before the second time; and changing the electronic device from the lock state to the unlock state at the third time based on the approach of the stylus pen at the third time, and a second operation, the second operation including: changing the electronic device from the unlock state to the lock state at the second time while using a second application program irrelevant to use of the stylus pen before the second time; and stopping changing the electronic device from the lock state to the unlock state at the third time despite the approach of the stylus pen at the third time.

According to an embodiment, the method may further include a first operation including, when an input finally identified before changing the electronic device from the unlock state to the lock state at the second time is relevant to the stylus pen, changing the electronic device from the lock state to the unlock state at the third time based on the approach of the stylus pen at the third time and a second operation including, when the input finally identified before changing the electronic device from the unlock state to the lock state at the second time in the second operation is irrelevant to the stylus pen, stopping changing the electronic device from the lock state to the unlock state at the third time despite the approach of the stylus pen at the third time.

According to an embodiment, the method may further include detecting the approach of the stylus pen within the predetermined distance from the surface of the display in the lock state at a first time, receiving a wireless signal generated from the stylus pen by the approach of the stylus pen from the stylus pen through the wireless communication circuit at a second time, and changing the electronic device from the lock state to the unlock state if the second time is within a predetermined time of the first time.

According to an embodiment, the method may further include, when at least one predetermined operation is identified at a first time, stopping changing the electronic device from the lock state to the unlock state during a predetermined time after the first time despite reception of a wireless signal generated from the stylus pen through the wireless communication circuit. The at least one predetermined operation may include a first operation of detecting a movement of the electronic device, a second operation of detecting the stylus pen inserted in a recess formed in the housing, a third operation of determining that a distance between the stylus pen and the electronic device is a threshold or more based on the wireless signal generated from the stylus pen, and a fourth operation of detecting a touch input by an object other than the stylus pen.

According to an embodiment, the wireless signal generated from the stylus pen may include at least one of information for a location of the stylus pen with respect to the electronic device, information for a time when at least one signal generated from the stylus pen is transmitted to the electronic device, information for a battery of the stylus pen, and on/off information for at least one switch included in the stylus pen.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic device is not limited to the above-listed embodiments.

It should be appreciated that certain embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 1200) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. The term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

As is apparent from the foregoing description, according to an embodiment, the electronic device may perform connection with the pen input device via short-range wireless communication and be configured to release its security mode via the connected pen input device, thereby providing the user of the electronic device with various user experiences and convenience.

According to an embodiment, although the security mode of the electronic device is activated while the user of the electronic device performs handwriting input, the user may easily release the security mode of the electronic device via the pen input device.

According to an embodiment, the electronic device may be configured to release its security mode via the pen input device specifically when the preset condition is met, thus allowing the electronic device enhanced security.

While the disclosure has been shown and described with reference to certain example embodiments thereof, it will be understood by those skilled in the art that various changes in form and details may be made therein without departing from the disclosure as defined by the appended claims and their equivalents.

What is claimed is:

1. An electronic device, comprising:
   a housing;
   a display exposed through a portion of the housing;
   a wireless communication circuit disposed in the housing;
   a processor disposed in the housing and operatively connected with the display and the wireless communication circuit; and
   a memory operatively connected with the processor, wherein the memory stores instructions executable by the processor to cause the electronic device to:
   at a first time point, change the electronic device from a lock state to a unlock state in response to a user's input,
   at a second time point after the first time point, change the electronic device from the unlock state to the lock state,
   after the second time point, detect an approach of a stylus pen within a predetermined distance from a surface of the display in the lock state,
   at a third time point after the second time point, receive a wireless signal generated by the stylus pen based on the approach of the stylus pen, through the wireless communication circuit, and
   change the electronic device from the lock state to unlock state if the third time point is within a first predetermined time from the first time point, or if the third time point is within a second predetermined time from the second time point.

2. The electronic device of claim 1, wherein the display further includes a digitizer, and wherein the instructions are further executable by the processor to cause the electronic device to: detect the stylus pen based on an electromagnetic signal generated by the digitizer.

3. The electronic device of claim 1, wherein the housing further includes a recess extending along a length of the housing, and the stylus pen is removably insertable into the recess.

4. The electronic device of claim 1, wherein the wireless communication circuit is configured to support a Bluetooth standard.

5. The electronic device of claim 1, wherein:
   when a state of the electronic device is changed from the unlock state to the lock state at the second time point based on execution of a first application program which is associated with a use of the stylus pen before the second time point, and the state of the electronic device is changed from the lock state to the unlock state at the third time point based on approach of the stylus pen at the third time point, and
   when the state of the electronic device is changed from the unlock state to the lock state at the second time point based on execution of a second application program which is not associated with a use of the stylus pen before the second time point, and the state of the electronic device maintains the lock state at the third time point despite the approach of the stylus pen at the third time point.

6. The electronic device of claim 1, wherein:
   when an input lastly identified before changing the electronic device from the unlock state to the lock state at the second time point is associated with the stylus pen, a state of the electronic device is changed from the lock state to the unlock state at the third time point based on the approach of the stylus pen at the third time point, and
   when the input lastly identified before changing the electronic device from the unlock state to the lock state at the second time point is not associated with the stylus pen, the state of the electronic device maintains the lock state at the third time despite the approach of the stylus pen at the third time point.

7. The electronic device of claim 1, wherein the instructions are further executable by the processor to cause the electronic device to:
   when at least one predetermined operation is identified at a fourth time point, control not to change the electronic device from the lock state to the unlock state during a predetermined time after the fourth time point despite reception of a wireless signal generated from the stylus pen through the wireless communication circuit, and
   wherein the at least one predetermined operation includes:
   detecting a movement of the electronic device;
   detecting the stylus pen inserted in a recess formed in the housing;
   determining that a distance between the stylus pen and the electronic device is a threshold or more based on the wireless signal generated from the stylus pen; and
   detecting a touch input by an object other than the stylus pen.

8. The electronic device of claim 1, wherein the wireless signal generated from the stylus pen includes at least one of information for a location of the stylus pen with respect to the electronic device, information for a time when at least one signal generated by the stylus pen is transmitted to the electronic device, information for a battery of the stylus pen, and on/off information for at least one switch included in the stylus pen.

9. A method for controlling an electronic device, the electronic device including a housing, a display exposed through a portion of the housing, a wireless communication circuit disposed in the housing, a processor disposed in the housing and operatively connected with the display and the wireless communication circuit, and a memory operatively connected with the processor, the method comprising:
at a first time point, changing the electronic device from a lock state to a unlock state in response to a user's input,
at a second time point after the first time point, changing the electronic device from the unlock state to the lock state,
after the second time point, detecting an approach of a stylus pen within a predetermined distance from a surface of the display in the lock state;
at a third time point after the second time point, receiving a wireless signal generated by the stylus pen based on the approach of the stylus pen, through the wireless communication circuit, and
changing the electronic device from the lock state to the unlock state if the third time point is within a first predetermined time from the first time point, or if the third time point is within a second predetermined time from the second time point.

10. The method of claim 9, wherein the display further includes a digitizer, and
wherein the method further comprises detecting the stylus pen based on an electromagnetic signal generated by the digitizer.

11. The method of claim 9, wherein the housing further includes a recess extending along a length of the housing, the stylus pen removably insertable into the recess.

12. The method of claim 9, wherein the wireless communication circuit is configured to support Bluetooth standard.

13. The method of claim 9, wherein:
when a state of electronic device is changed from the unlock state to the lock state at the second time point based on execution of a first application program which is associated with a use of the stylus pen before the second time point,
when the state of the electronic device is changed from the lock state to the unlock state at the third time point based on the approach of the stylus pen at the third time point; and
when the state of the electronic device is changed from the unlock state to the lock state at the second time point based on execution of a second application program which is not associated with a use of the stylus pen before the second time point, and
the state of the electronic device maintains the lock state at the third time point despite the approach of the stylus pen at the third time point.

14. The method of claim 9, wherein:
when an input lastly identified before changing the electronic device from the unlock state to the lock state at the second time point is associated with to the stylus pen, a state of the electronic device is changed from the lock state to the unlock state at the third time based on the approach of the stylus pen at the third time point, and
when the input lastly identified before changing the electronic device from the unlock state to the lock state at the second time point in a second operation is not associated with the stylus pen, the state of the electronic device maintains the lock state despite the approach of the stylus pen at the third time point.

15. The method of claim 9, further comprising when at least one predetermined operation is identified at a fourth time point, controlling not to change the state of the electronic device from the lock state to the unlock state during a predetermined time after the fourth time point despite reception of a wireless signal generated from the stylus pen through the wireless communication circuit,
wherein the at least one predetermined operation includes:
detecting a movement of the electronic device;
detecting the stylus pen inserted in a recess formed in the housing;
determining that a distance between the stylus pen and the electronic device is a threshold or more based on the wireless signal generated from the stylus pen; and
detecting a touch input by an object other than the stylus pen.

16. The method of claim 9, wherein the wireless signal generated from the stylus pen includes at least one of information for a location of the stylus pen with respect to the electronic device, information for a time when at least one signal generated by the stylus pen is transmitted to the electronic device, information for a battery of the stylus pen, and on/off information for at least one switch included in the stylus pen.

17. An electronic device, comprising:
a housing;
a display exposed through a portion of the housing;
a wireless communication circuit disposed in the housing;
a processor disposed in the housing and operatively connected with the display and the wireless communication circuit; and
a memory operatively connected with the processor, wherein the memory stores instructions executable by the processor to cause the electronic device to:
at a first time point, change the electronic device from a lock state to a unlock state in response to a user's input,
at a second time point after the first time point, change the electronic device from the unlock state to the lock state,
after the second time point, detect an approach of a stylus pen within a predetermined distance from a surface of the display in the lock state, and
change the electronic device from the lock state to the unlock state based at least in part on receiving, through the wireless communication circuit, at a third time point after the second time point, a wireless signal generated by the stylus pen based on the approach of the stylus pen, wherein:
when a state of the electronic device is changed from the unlock state to the lock state at the second time point based on execution of a first application program which is associated with a use of the stylus pen before the second time point, and the state of the electronic device is changed from the lock state to the unlock state at the third time point based on approach of the stylus pen at the third time point, and
when the state of the electronic device is changed from the unlock state to the lock state at the second time point based on execution of a second application program which is not associated with a use of the stylus pen before the second time point, and the state of the electronic device maintains the lock state at the third time point despite the approach of the stylus pen at the third time point.

18. The electronic device of claim 17, wherein the instructions are further executable by the processor to cause the electronic device to change the electronic device from the lock state to the unlock state if the third time point is within a first predetermined time from the first time point, or if the third time point is within a second predetermined time from the second time point.

* * * * *